(12) United States Patent
Leone et al.

(10) Patent No.: US 11,512,624 B1
(45) Date of Patent: Nov. 29, 2022

(54) SYSTEMS AND METHODS FOR ADJUSTABLE PRE-CHAMBER

(71) Applicant: Ford Global Technologies, LLC, Dearborn, MI (US)

(72) Inventors: Thomas Leone, Ypsilanti, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/643,143

(22) Filed: Dec. 7, 2021

(51) Int. Cl.
 *F02B 19/10* (2006.01)
 *F02B 19/12* (2006.01)

(52) U.S. Cl.
 CPC ...... *F02B 19/1047* (2013.01); *F02B 19/1033* (2013.01); *F02B 19/12* (2013.01)

(58) Field of Classification Search
 CPC ... F02B 19/1047; F02B 19/1033; F02B 19/12
 See application file for complete search history.

(56) References Cited

U.S. PATENT DOCUMENTS

| | | | | |
|---|---|---|---|---|
| 4,424,780 A | * | 1/1984 | Trucco | F02M 26/01 123/557 |
| 11,066,980 B1 | | 7/2021 | Leone et al. | |
| 11,085,402 B1 | * | 8/2021 | Vroman | F02M 23/04 |
| 11,156,149 B1 | | 10/2021 | Leone et al. | |
| 2006/0219210 A1 | | 10/2006 | Bailey et al. | |
| 2019/0353088 A1 | * | 11/2019 | Ketterer | F02B 19/108 |
| 2021/0262393 A1 | | 8/2021 | Leone et al. | |
| 2022/0003176 A1 | | 1/2022 | Leone et al. | |

FOREIGN PATENT DOCUMENTS

GB  2183727 A  6/1987

OTHER PUBLICATIONS

Leone, T. et al., "Systems and Methods for Adjustable Pre-Chamber," U.S. Appl. No. 17/233,136, filed Apr. 16, 2021, 73 pages.
Czekala, M. et al., "Systems and Methods for Adjustable Pre-Chamber," U.S. Appl. No. 17/233,191, filed Apr. 16, 2021, 73 pages.

* cited by examiner

*Primary Examiner* — Xiao En Mo
(74) *Attorney, Agent, or Firm* — Vincent Mastrogiacomo; McCoy Russell LLP

(57) ABSTRACT

Methods and systems are provided for an engine, including an engine cylinder coupled to a cylinder head, and a pre-chamber. The pre-chamber includes a first end proximal to the cylinder head, a spark gap, and pre-chamber walls enclosing an internal volume including a dead volume. The dead volume includes all of the internal volume positioned between the first end and the spark gap. A moveable element is positioned in the internal volume and fluidly coupled to the dead volume, wherein moving the moveable element changes a ratio of the dead volume to the internal volume. In this way, combustion conditions may be enhanced at a plurality of engine conditions.

20 Claims, 17 Drawing Sheets

SYSTEMS AND METHODS FOR ADJUSTABLE PRE-CHAMBER

FIELD

The present description relates generally to methods and systems for adjusting a pre-chamber volume.

BACKGROUND/SUMMARY

An internal combustion engine may combust an air-fuel mixture within cylinders to produce torque, which may be used to propel a vehicle. In some such engines, an ignition source may be used to ignite the air-fuel mixture within each cylinder during a compression stroke. For example, in spark-ignition engines, each cylinder may include a spark plug for directly igniting the air-fuel mixture within the cylinder. In other examples, the air-fuel mixture within the cylinder may be ignited by jets of hot gas and flame from a pre-combustion chamber, referred to herein as a pre-chamber.

A passive pre-chamber may be a walled chamber located in the clearance volume of the cylinder and may include a spark plug. During engine operation, an air-fuel mixture is introduced into the cylinder, and a fraction of the air-fuel mixture is inducted into the passive pre-chamber via a pressure differential between the passive pre-chamber and the cylinder during a compression stroke of the cylinder. When ignition is requested, the spark plug in the pre-chamber is actuated, igniting the fraction of the air-fuel mixture in the pre-chamber. After the fraction of the air-fuel mixture is ignited in the pre-chamber, jets of flame and hot gas may exit the pre-chamber and enter the cylinder via one or more holes in the pre-chamber walls. These jets ignite the air-fuel mixture in the cylinder to produce torque.

Pre-chamber ignition may offer performance and efficiency benefits over a traditional spark-ignition engine during some engine operating conditions. For example, a cylinder with pre-chamber ignition may operate with more dilution (e.g., more exhaust gas recirculation or a leaner air-fuel ratio) than a similar cylinder of a traditional spark-ignition engine, which may lead to lower fuel consumption and emissions. In other examples, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

In some examples of pre-chambers, a series gap igniter may be arranged therein. The series gap igniter may include a first spark gap in a first volume and a second spark gap in a second volume. The second spark gap outside the pre-chamber may provide ignition at a wide range of conditions.

However, the inventors herein have recognized potential issues with such systems. As one example, a passive pre-chamber without a series gap igniter may not provide reliable ignition over the full range of engine operating conditions. Thus an engine with a passive pre-chamber may demand a second spark plug, which increases cost and decreases the space available for valves, fuel injectors, cooling passages, etc. As another example, the electrodes of the series gap igniter may heat up during some engine conditions. The electrode of the previous example may be unable to sufficiently dissipate this heat during higher power engine conditions, leading to hot spots. The hot spots may cause undesired pre-ignition, which may decrease engine power output and combustion stability. Repeated occurrence of the hot spots may reduce a remaining useful life of the spark plug. Furthermore, a packaging size of the series gap igniter in a pre-chamber may be greater than pre-chambers with an ignition device including only a single spark gap.

In one example, the issues described above may be addressed by an engine, including an engine cylinder coupled to a cylinder head, and a pre-chamber. The pre-chamber includes a first end proximal to the cylinder head, a spark gap, and pre-chamber walls enclosing an internal volume including a dead volume. The dead volume includes all of the internal volume positioned between the first end and the spark gap. A moveable element is positioned in the internal volume and fluidly coupled to the dead volume, wherein moving the moveable element changes a ratio of the dead volume to the internal volume. In this way, a technical effect of enhancing combustion conditions across a plurality of engine conditions can be achieved.

As one example, the moveable element, is adjusted in response to a change in intake valve closing (IVC) timing. The moveable element may be moved to increase a ratio of the dead volume to the internal volume of the pre-chamber in response to the IVC closing timing moving further away from bottom dead center (BDC). Conversely, the moveable element may be moved to decrease a ratio of the dead volume to the internal volume of the pre-chamber in response to the IVC closing timing moving closer towards bottom dead center (BDC). As another example, the IVC timing may be adjusted in response to a change in the ratio of the dead volume to the internal volume of the pre-chamber. As such, fuel economy may increase and a longevity of an ignition device of the pre-chamber may also increase.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
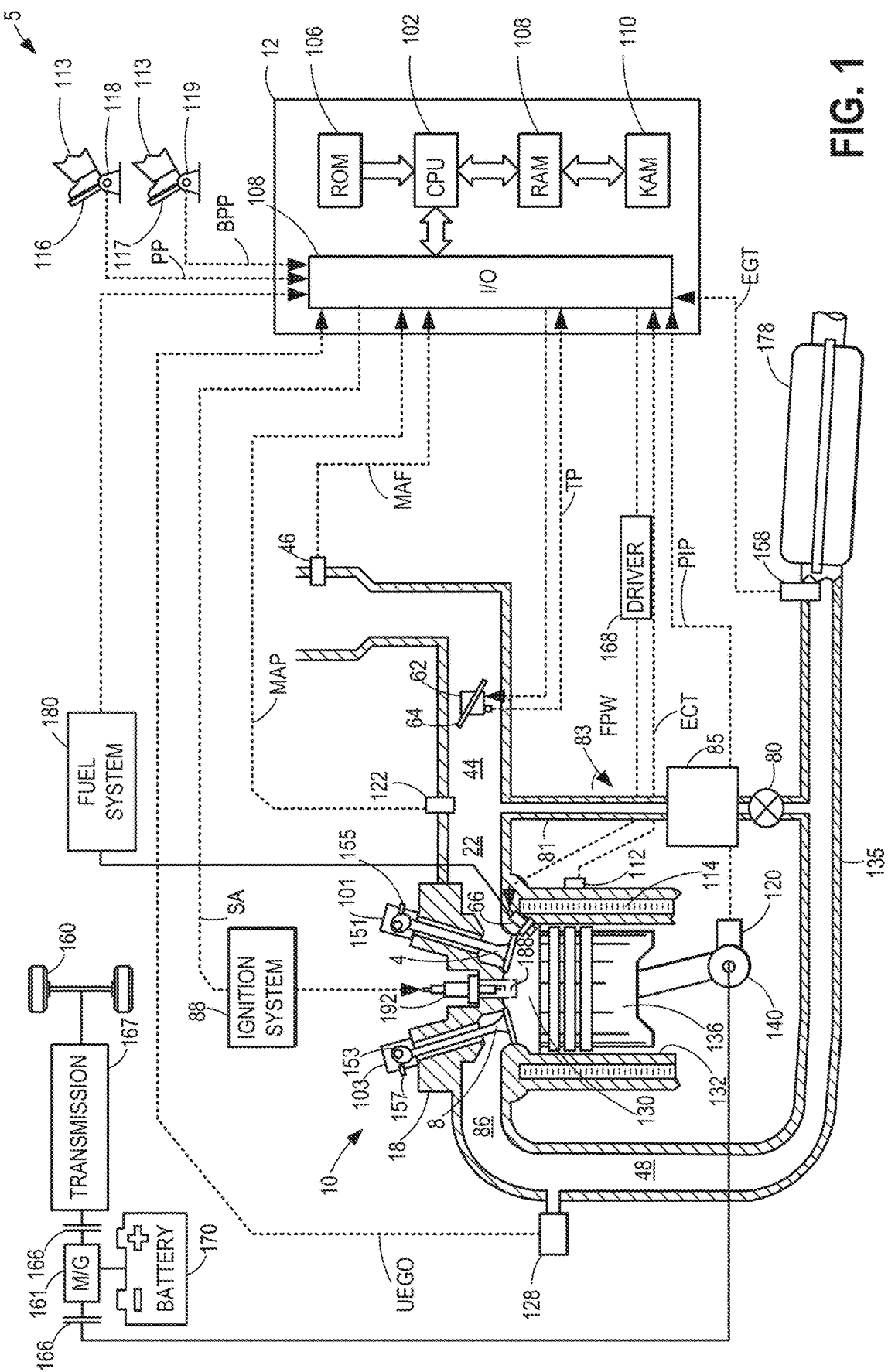
FIG. 1 shows a schematic depiction of a cylinder configuration in an engine system of a vehicle.

The following description relates to systems and methods for a pre-chamber. In one example, the pre-chamber is positioned in a main combustion chamber of an engine of a hybrid vehicle, as illustrated in FIG. 1. The pre-chamber may include a moveable element, wherein moving the moveable element adjusts a relative magnitude of the dead volume compared to the internal volume of the pre-chamber (e.g., the ratio of the dead volume to the internal volume). By doing this, reliable ignition of the main combustion chamber may be maintained over a wider range of engine operating conditions, without a second spark plug or an injector in the pre-chamber, and while reducing the probability of hot spots as from a series gap igniter. Various embodiments of the moveable element in the pre-chamber are illustrated in FIGS. 2A, 3A, 3B, 3D, 4A, 4B, 5A, and 5B. Furthermore, cross-sectional views of the pre-chamber are illustrated in FIGS. 2B, 2C, 2D, 2E, 2F, 2G, and 3C showing the concentric positioning and symmetry of various features of the pre-chamber, which can aid in increasing mixing efficiency and reducing heat transfer and concentration gradients in the pre-chamber. A method for adjusting the orifice size of the pre-chamber in response to an engine load is illustrated in FIGS. 8 and 9, and a timeline for operating the engine, including the pre-chamber of FIGS. 2A, 3A, 3B, 3D, 4A, 4B, 5A, and 5B is illustrated in FIG. 9.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Cylinder 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view, intake valve 4 and exhaust valve 8 are located at an upper region of cylinder 130, and may be coupled to a cylinder head 18. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valve and exhaust valve may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

As one example, early intake valve closing (IVC) timing, referring to closing of the intake valve 4 prior to the piston 136 reaching bottom dead center (BDC), can allow for air to be drawn into the cylinder 130 at close to atmospheric pressure at the beginning of the induction stroke. The intake valve 4 may be closed by the controller 12 during the induction (e.g., intake) stroke to prevent any further air from entering the cylinder 130, thus restricting the trapped air mass inside the cylinder 130. Once the intake valve 4 is closed, the pressure inside the cylinder 130 falls as the piston 136 continues moving towards BDC. The work done by the piston 136 as it continues to move to BDC to expand the air can be recovered at the beginning of the compression stroke, when the piston 136 begins moving towards TDC because after early closing of the intake valve, the air within the cylinder 130 will act like a gas spring, allowing this work recovery. As such, early IVC timing can aid in reducing engine pump work, as compared with conventional throttling strategies, and thereby increase engine efficiency and reduce fuel consumption.

As another example, late IVC timing, referring to closing of the intake valve 4 after the piston 136 reaches bottom dead center (BDC), allows air to be drawn into the cylinder close to atmospheric pressure for the entire induction stroke, thus increasing the air mass drawn into cylinder 130. Furthermore, the controller 12 may hold intake valve 4 open during the beginning of the compression stroke, as the piston 136 begins moving toward TDC, thereby allowing some of the trapped air to flow back out of the cylinder 130 into the intake manifold 44. After the controller 12 closes the intake valve 4, the air remaining in the cylinder 130 is compressed. By controlling the air mass trapped in the cylinder 130, late IVC timing can aid in reducing engine pump work, as compared with conventional throttling strategies, and thereby increase engine efficiency and reduce fuel consumption.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO, a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount of EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically actuated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through an EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load, engine speed, engine temperature, etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid-load, the amount of EGR requested may increase, and then as the engine load increases from a mid-load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. The compression ratio may also be increased if pre-chamber ignition increases knock resistance due to faster combustion.

The effective compression ratio may further be influenced by other engine operational factors such as valve timing and boosted engine operation. For example, both early and late IVC timing can reduce air mass inducted into the cylinder, thereby reducing the effective compression ratio. In contrast, boosted engine operation, whereby the intake pressure is raised above atmospheric pressure through mechanical turbocharging and/or supercharging, increases the effective compression ratio.

As a non-limiting example, cylinder 130 is shown including a fuel injector 66. Fuel injector 66 is shown coupled directly to cylinder 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. In another example, fuel injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from fuel injector 66 may vary with operating conditions. Furthermore, for a single combustion event, multiple injections of the delivered fuel may be performed per cycle. The multiple injections may be performed during a compression stroke, intake stroke, or any appropriate combination thereof.

In the example shown in FIG. 1, cylinder 130 includes a pre-chamber igniter 192 coupled to cylinder head 18 for initiating combustion. In some examples, the pre-chamber igniter 192 may be coupled to a mounting surface different than the cylinder head 18, such as a cylinder block or other portion of the cylinder. Pre-chamber igniter 192 includes a spark generating device such as a spark plug including a center electrode 204 and a ground electrode 246 forming a spark gap 240 therebetween, as described in FIG. 2A, and further may include an internal cavity, referred to herein as a pre-chamber 188. Pre-chamber 188 may be configured with various embodiments of moving elements positioned in the internal volume of the pre-chamber, as illustrated in FIGS. 2A, 3A, 3B, 3D, 4A, 4B, 5A, and 5B. In one example, the pre-chamber igniter 192 is the only ignition device of the cylinder 130. As such, there are no other ignition devices in the engine 10 other than the pre-chamber igniter 192 corresponding to each cylinder 130.

The walls of pre-chamber 188, which enclose the pre-chamber spark plug, may include a plurality of openings 238 and 242. Each of the plurality of openings 238 and 242 may provide a fluid coupling between pre-chamber 188 and an interior of cylinder 130. In one example, the pre-chamber 188 may include an actuator 225 configured to adjust an opening size of the plurality of openings 238 and 242 responsive to the operating conditions of the engine 10. Thus, during some engine operating conditions, gases may flow between pre-chamber 188 and the interior of cylinder 130. For example, gases (e.g., air, fuel, and/or residual combustion gases) may flow through each of the plurality of openings 238 and 242 with a directionality and rate based on a pressure difference across the openings (e.g., between pre-chamber 188 and the interior of cylinder 130). Further, each of the plurality of openings 238 and 242 may expel an ignition flame (or jet) to cylinder 130, as will be elaborated with respect to FIGS. 2A-2G, and 6.

An ignition system 88 may produce an ignition spark in pre-chamber igniter 192 in response to a spark advance signal SA from controller 12 under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event, or to provide a torque reserve. When pre-chamber igniter 192 sparks, the air-fuel mixture within the pre-chamber may combust, the increased pressure of combustion sending jets of flame into cylinder 130 via the plurality of orifice openings in the pre-chamber walls. The plurality of openings 238 and/or 242 may be arranged such that the jets of flame are evenly distributed and directed into the cylinder 130. The jets of flame may ignite the air-fuel mixture in cylinder 130, causing combustion in cylinder 130. Additionally or alternatively, the size of the plurality of pre-chamber openings may be adjusted such that jets of flame occur reliably over a wider range of engine operating conditions. Additionally or alternatively, the size of the plurality of pre-chamber openings 238 and/or 242 may be adjusted such that for some engine operating conditions, combustion inside the pre-chamber igniter 192 may propagate into the air-fuel mixture within cylinder 130 without creating jets of flame.

Figure 6:
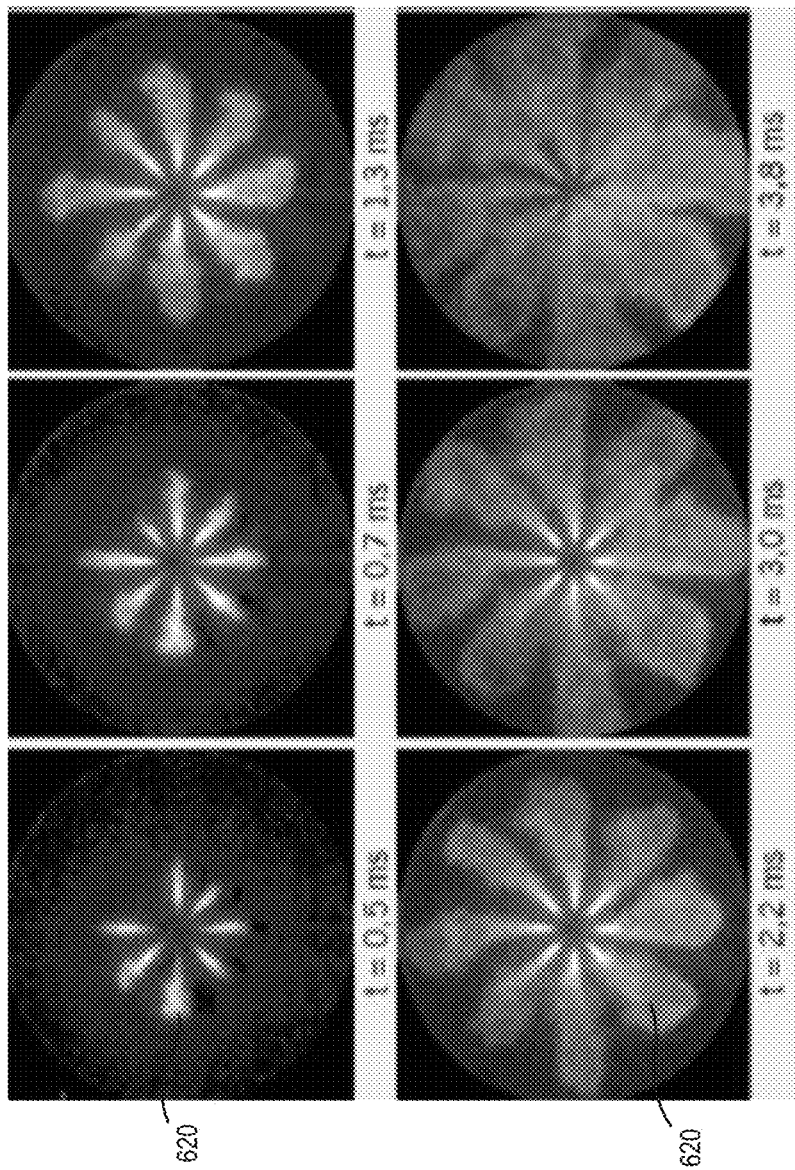
FIG. 6. Shows images of example ignition patterns and ignition dynamics associated with pre-chamber ignition.

Pre-chamber ignition, also termed pre-chamber volume ignition, is shown in a series of images 602 in FIG. 6. With pre-chamber ignition, spark ignition of a small volume of air-fuel mixture inside the pre-chamber generates high-temperature flame jets 620 that extend out of the pre-chamber's orifices into the main combustion chamber (e.g., cylinder 130). As such, flame initiation occurs by way of the hot gas flame jets 620 at multiple ignition sites. Furthermore, the main charge (e.g., the air-fuel mixture in the cylinder 130) is ignited with an energy on the order of the chemical bound energy of the pre-chamber small volume air-fuel mixture, which is much higher as compared with the single spot spark energy ignition that occurs in the absence of the pre-chamber. In particular, the high-temperature jets form a more robust and higher energy igniter in the main combustion chamber, which allows for higher dilution (e.g., higher EGR flows) and increases engine efficiency. Also shown in FIG. 6, the high-temperature flame jets are formed very rapidly, after only 0.5 ms, and grow and extend, spreading significantly after just 3-4 ms. In this way, pre-chamber volume ignition can allow for very fast combustion, which can aid in decreasing engine knock and enabling further increases in engine efficiency. Furthermore, the orientation and extension of the high-temperature flame jets may be controlled by adjusting the size, shape, and orientation of the pre-chamber openings. For example, as shown in the series of images 602, the high-temperature flame jets are generated with a rotationally symmetric pattern, emanating from a spark gap positioned centrally thereto. The rotationally symmetric pattern arises from directing the flame jets through openings 238 and/or 242 in the pre-chamber that are positioned to have rotational symmetry about the spark gap, as further described with reference to FIGS. 2B, 2C, and 2D. In other examples, the flame jets may be rotationally asymmetric, arising from directing the flame jets through openings 238 and/or 242 in the pre-chamber that are positioned to have rotational asymmetry about the spark gap. In other words, the openings 238 and/or 242 may be distributed around the spark gap, between $\theta=0$ and $\theta=360$ degrees, but in an asymmetrical manner.

Returning to FIG. 1, engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor unit 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 46, an engine coolant temperature signal (ECT) from an ECT sensor 112 coupled to coolant sleeve 114, signal UEGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an manifold absolute pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold 44.

Based on input from one or more of the above-mentioned sensors, controller 12 may adjust one or more actuators, such as fuel injector 66, throttle 62, pre-chamber igniter 192, the intake/exhaust valves and cams, etc. The controller may receive input data from the various sensors, process the input data, and trigger the actuators in response to the processed input data based on instructions or code programmed therein corresponding to one or more routines, an example of which is described with respect to FIGS. 7, 8A, and 8B.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), igniter, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Figure 2A:
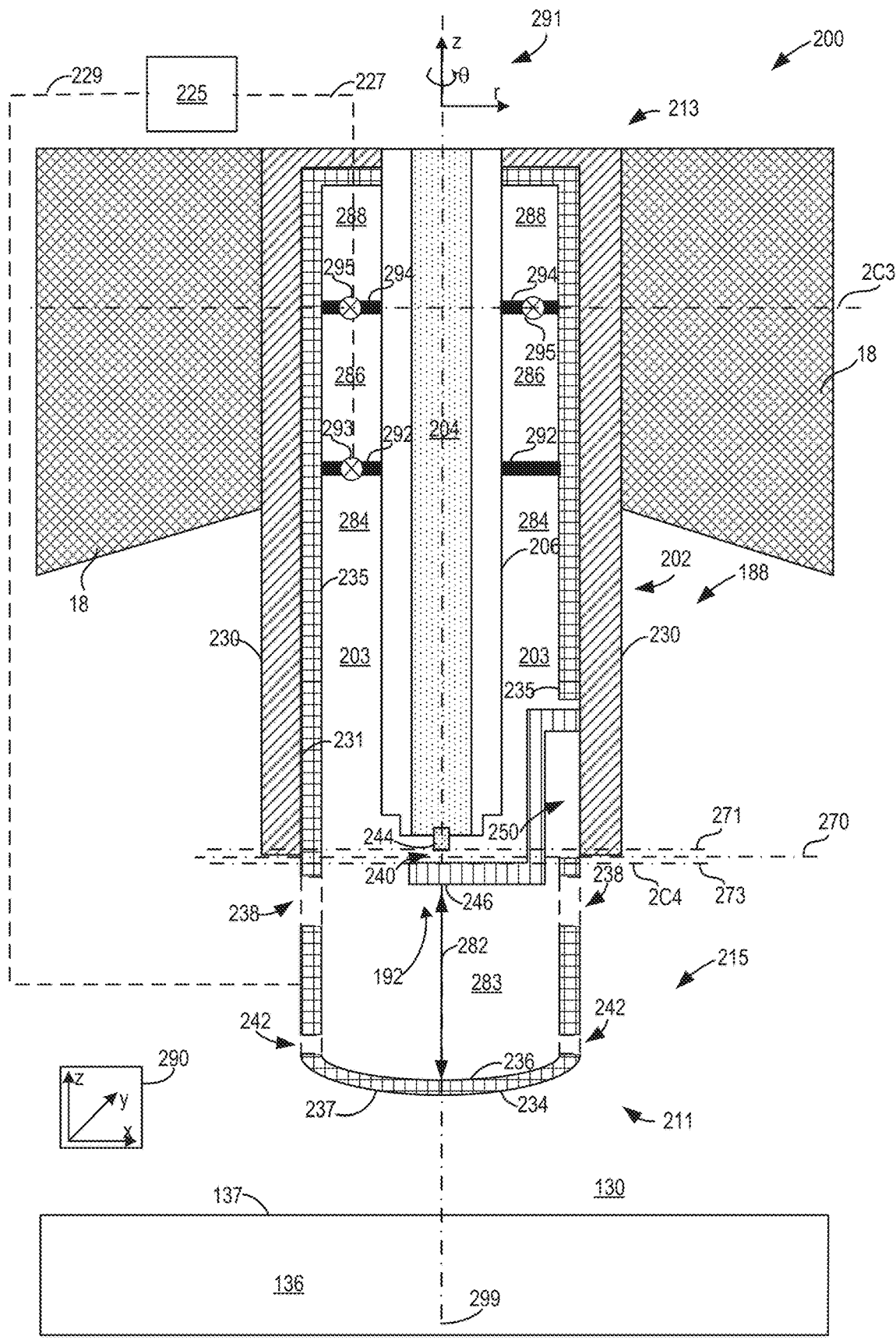
FIG. 2A schematically shows a detailed view of a pre-chamber system including a first embodiment of a moveable element.

Next, FIG. 2A shows a longitudinal cross-sectional view of a pre-chamber system 200, which may be one example of the pre-chamber 188 (a component of pre-chamber igniter 192) introduced in FIG. 1. As such, components previously introduced in FIG. 1 are numbered identically in this figure and subsequent figures. In particular, FIG. 2A shows the pre-chamber system 200 including one or more moveable elements positioned in the internal volume 203 of the pre-chamber 188, wherein the one or more moveable elements include one or more valves 293 and 295.

An axis system 290 includes three-axes, namely an x-axis parallel to a horizontal direction, a z-axis parallel to a vertical direction, and a y-axis parallel to a transverse direction and normal to each of the x- and z-axes. The axis system 290 is merely illustrative and does not suggest a limiting orientation of the pre-chamber 188. In some examples, additionally or alternatively, the z-axis may be parallel to horizontal (e.g., a horizontally opposed engine) or angled to horizontal and vertical (e.g., a V-orientation engine) without departing from the scope of the present disclosure. A thickness of elements of the pre-chamber 188 may be measured along the x-axis. A width of elements of the pre-chamber 188 may be measured along the y-axis. A length of elements of the pre-chamber 188 may be measured along the z-axis. A cylindrical coordinate axis 291 may be utilized to describe the pre-chamber 188 for the case where the pre-chamber 188 includes a cylindrical or other rotationally symmetric pre-chamber body 202. Rotational symmetry, also known as radial symmetry in geometry, refers to the property a shape has when appears the same after some rotation by a partial turn. An object's degree of rotational symmetry is the number of distinct orientations in which it looks exactly the same for each rotation. The cylindrical coordinate axis 291 includes a z-axis coincident with the central (longitudinal) axis 299, a radial r-axis extending radially from the z-axis, and an angular θ-axis extending around the z-axis. The axis system 291 is merely illustrative and does not suggest a limiting orientation of the pre-chamber 188. As one example, a thickness of elements of the pre-chamber 188 may be measured along the r-axis, and a length of elements of the pre-chamber 188 may be measured along the z-axis. Furthermore, an angular position of elements around the z-axis may be described by their θ-coordinate, or azimuth.

As shown in FIG. 2A and elaborated above with respect to FIG. 1, the cylinder 130 is defined at least partially by the cylinder head 18, proximal to a first end 213 of the pre-chamber 188. Further, pre-chamber system 200 includes a pre-chamber body 202 extending from a first end 213 to a second end 211, which may form a substantially cylindrical tube, having rotational symmetry about a central axis 299. In particular, the pre-chamber body 202 may include an exterior surface 230 and an interior surface 231. Some portions of exterior surface 230 may be coupled to and/or positioned at a first end 213 proximal to cylinder head 18. As one example, pre-chamber body 202 may be threaded into cylinder head 18. As such, maintenance and/or replacement of the pre-chamber 188 is simplified relative to other ways of couplings (e.g., welding, fusion, and the like). Further, a portion of the pre-chamber body 202 may extend into the cylinder 130 from the cylinder head 18, projecting distally from the first end 213 towards a second end 211. Together, the pre-chamber body 202, a pre-chamber cap 234, and a pre-chamber sleeve 235 may provide walls that divide (e.g., separate) the internal volume 203 of the pre-chamber 188 from the cylinder 130, except for one or more openings 238 and 242 positioned at the second end 211 of the pre-chamber 188. In one example, the one or more openings 238 and 242 may be arranged at the pre-chamber cap 234 and/or pre-chamber sleeve 235, the pre-chamber cap 234 positioned at the second end 211 of the pre-chamber.

The plurality of openings 238 and 242 may include a plurality of shapes including circular, oblong, triangular, rectangular, and the like. Additionally or alternatively, the plurality of openings may be slits. For example, the slits may have a thickness (e.g., dimension parallel to radial coordinate, r) similar to the thickness of pre-chamber sleeve 235 and height (e.g., dimension parallel to central axis 299) 2 to 5 times larger than the thickness. Furthermore, the plurality of lower openings 238 and 242 may extend through an entire thickness of the pre-chamber sleeve 235. In particular, a thickness of the openings 238 and 242 may not be greater than a thickness of the pre-chamber sleeve 235 and/or pre-chamber body 202, so that a volume of the openings 238 and 242 fluidly connecting the pre-chamber 188 with cylinder 130 is reduced. By reducing volume of the openings 238 and 242, a residence time of combustion fluids (e.g., air, residual combustion gases, fuel, and the like) at the openings 238 and 242 is reduced so that the openings 238 and 242 maintain fast mixing and heat transfer dynamics at and between the pre-chamber 188 and the cylinder 130 during engine operation. Furthermore reducing a volume of openings 238 and 242 can aid in better propagating flame jets ignited in the pre-chamber 188 to the cylinder 130 because heat transfer from the flame jets to the walls of the pre-chamber cap 234 is reduced. In some examples, the cross-sectional area of the one or more openings 238 and 242 may be adjusted by more occluding or more exposing the one or more openings 238 and 242 when adjusting a position of the pre-chamber cap 234. In some cases, a magnitude of the internal volume 203 can be adjusted by adjusting a cross-sectional area of the one or more opening 238 and 242, independent of the volume of the cylinder 130, for example by adjusting a position of the pre-chamber cap 234.

Central axis 299 may be a longitudinal axis of the pre-chamber that is perpendicular to a surface 137 of piston 136 (only a portion of piston 136 is shown in FIG. 2A) and parallel to cylinder walls 132 (not shown in FIG. 2A), for example. In one example, the central axis 299 corresponds to an axis of motion along which the piston 136 oscillates. The pre-chamber body 202 may be directly or indirectly coupled to an electrical ground.

In one example, the pre-chamber body 202 comprises a tubular cylindrical shape. The pre-chamber body 202 may be open at extreme ends thereof with walls (e.g., exterior surface 230 and interior surface 231) extending towards a cylinder head 18 at a first end 213 and extending away from the cylinder head 18 at the second end 211. In alternative embodiments, the pre-chamber body 202 may not be tubular and instead may include a pyramidal, spherical, rectangular prism, or other three-dimensional shape with ends thereof being open.

The pre-chamber cap 234 may include a domed, disk shape protruding in a direction toward the piston 136 and away from the spark gap 240. In some examples, additionally or alternatively, the pre-chamber cap 234 may be flat or protrude toward the spark gap 240. The pre-chamber cap 234 includes an inner surface 236 and an outer surface 237. Outer surface 237 is the closest surface of pre-chamber cap 234 to piston 136. The pre-chamber cap may be extendable in that a distance between a top surface 137 of piston 136 and outer surface 237 may be smaller when pre-chamber cap 234 is in an extended position (e.g., extended away from cylinder head 18) and larger when pre-chamber cap 234 is in a retracted position (e.g., retracted toward cylinder head 18). The pre-chamber sleeve 235 may include a tube shape with the central axis 299 passing through a geometric center thereof. The pre-chamber sleeve 235 may be manufactured as single piece integrally with pre-chamber cap 234. In other examples, the pre-chamber cap 234 and pre-chamber sleeve 235 may be separate pieces coupled together via welds, fusions, adhesives, threading, one or more interlocking features, or the like. In the example shown, a portion of the pre-chamber sleeve 235 at the first end 213 is encircled by pre-chamber body 202, with an outer surface of pre-chamber sleeve 235 having a smaller diameter than interior surface 231 of pre-chamber body 202.

A material of the pre-chamber cap 234 and/or the pre-chamber sleeve 235 may be cast iron, stainless steel, aluminum, carbon fiber, magnesium, or the like. The material of the pre-chamber cap 234 and/or the pre-chamber sleeve 235 may be similar to or different than a material of the pre-chamber body 202.

Pre-chamber cap 234 and pre-chamber sleeve 235 may be movable along central axis 299 by way of actuator 225. For example, actuator 225 may adjust the position of pre-chamber cap 234 and pre-chamber sleeve 235 in a direction that is parallel to central axis 299 (e.g., as indicated by bi-directional arrow 282), into and out of the cylinder 130, to adjust a size of openings 238 and 242. Adjusting the position of pre-chamber cap 234 may further adjust a magnitude of the ignition volume 283 and the total internal volume 203, without adjusting the size of the dead volume 284. Actuator 225 may be directly coupled to pre-chamber sleeve 235, and may thereby act directly on pre-chamber sleeve 235 or may be indirectly coupled via a linkage, a cam, etc. In the example shown, pre-chamber sleeve 235 is coupled to actuator 225 via a linkage 227, and thus, movement of the linkage may be transferred to pre-chamber sleeve 235. In some examples, actuator 225 may continuously vary the position of pre-chamber sleeve 235 based on engine conditions, such as an engine load, to adjust the orifice opening size.

A plurality of openings 238 and 242 may be arranged on pre-chamber sleeve 235. The size and shape of the plurality of openings 238 may be similar to or different from those of openings 242 in one or more of size and shape. In one example, cross-sectional flow through areas of the plurality of lower openings 242 and/or the plurality of upper openings 238 may be non-uniform such that a restriction is arranged therein. The restriction may generate a vacuum which under some conditions, may promote gas flow into or out of the internal volume 203 of the pre-chamber 188. In one example, the restriction may be similar to a venturi shape.

The plurality of openings 238 are located, relative to the plurality of openings 242, in closer proximity to the cylinder head 18. Depending on the position of pre-chamber cap 234, the plurality of openings 238 may either be blocked or exposed by interior surface 231 and thus, may not fluidly couple internal volume 203 of pre-chamber 188 to cylinder 130 or may fluidly couple internal volume 203 of pre-chamber 188 to cylinder 130, respectively. Accordingly, under certain conditions, each of the openings 242 and the openings 238 may provide a fluid connection between internal volume 203 of the pre-chamber 188 and the cylinder 130.

Figure 2B:
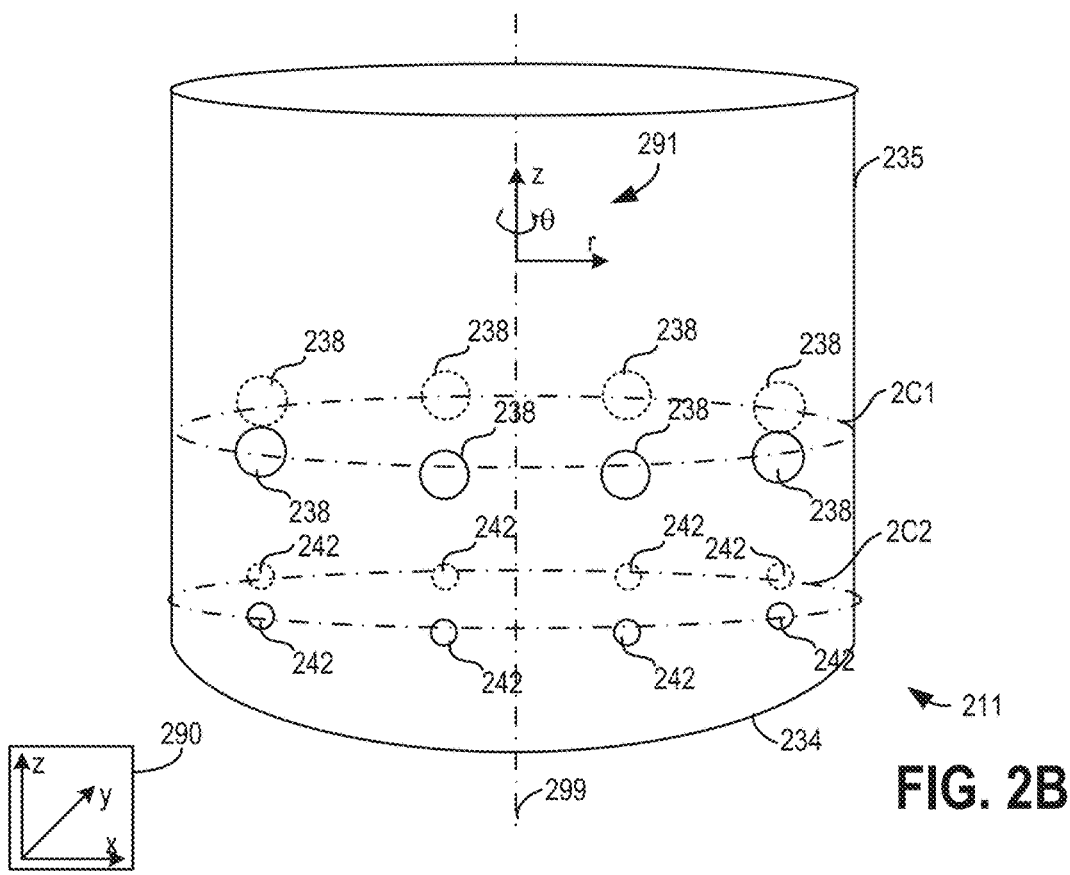
FIG. 2B schematically shows a partial semi-transparent view of the pre-chamber system of FIG. 2A at a second end, including a plurality of openings.
Figures 2C, 2D:
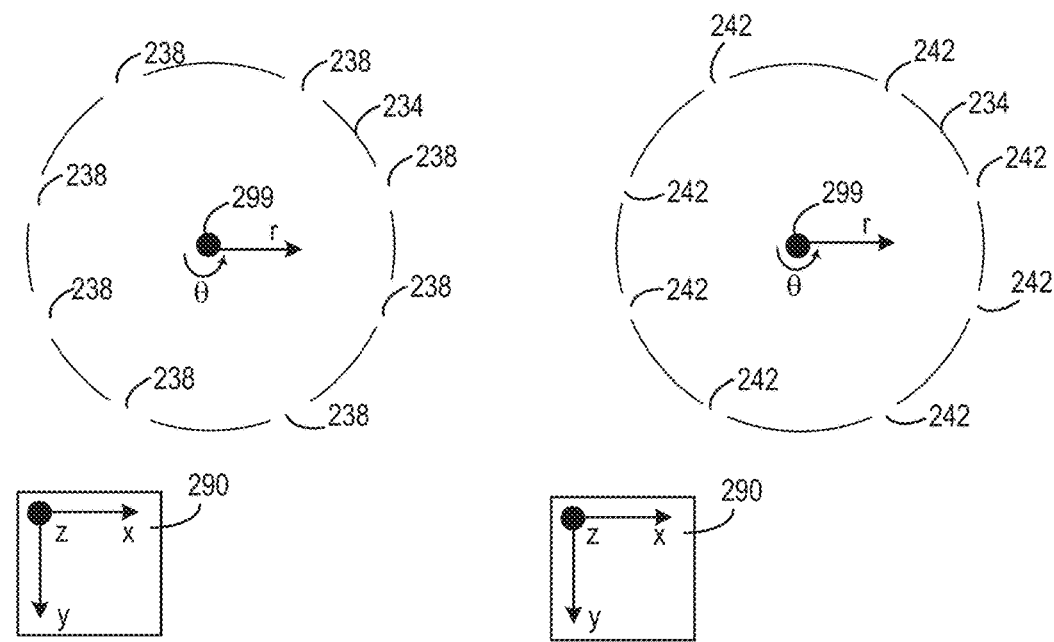
FIGS. 2C and 2D schematically show cross-sectional views of the pre-chamber system of FIG. 2B at the second end at sections 2C1 and 2C2, respectively.

Turning now to FIGS. 2B, 2C, and 2D, FIG. 2B shows a partial semi-transparent view of the pre-chamber cap 234 coupled extending from the pre-chamber sleeve 235 towards the second end 211, including a plurality of openings 238 and 242; FIGS. 2C and 2D show cross sectional views of the pre-chamber cap 234 at sections 2C1 and 2C2, respectively. For simplicity, the walls of pre-chamber sleeve 235 are depicted as thin lines, however, the wall thickness (and thickness of openings 238 and 242) of the pre-chamber sleeve 235 may be thicker, as represented in other figures such as FIG. 2A. As shown in FIG. 2B, the openings 238 may be of a different size than the plurality of openings 242, and the openings 242 may be positioned closer to the second end 211 than the openings 238. Furthermore, the plurality of openings 238 may be positioned along an x-y plane of constant z-coordinate (e.g., coplanar with section 2C1) and the plurality of openings 242 may be positioned along another x-y plane of constant z-coordinate (e.g., coplanar with section 2C2). Further still, the openings 238 and the openings 242 may be arranged in a rotationally symmetrical configuration about the central axis 299, as shown in FIGS. 2C and 2D, respectively. In particular, the rotationally symmetrical configuration of the openings 238 and 242 refer to each of the openings being positioned at an equivalent r-coordinate from the central axis 299, and evenly spaced about azimuthal θ-coordinate positions around the central axis 299 from 0 to 360 degrees. Having the openings 238 and 242, and the moveable elements (e.g., valves 293 and 295) rotationally symmetric about the central axis 299 aids in in increasing fluid heat and mass transfer rates of combustion gases and the ignition flame jets between the pre-chamber 188 and the cylinder 130 during compression and combustion.

Figure 4A:
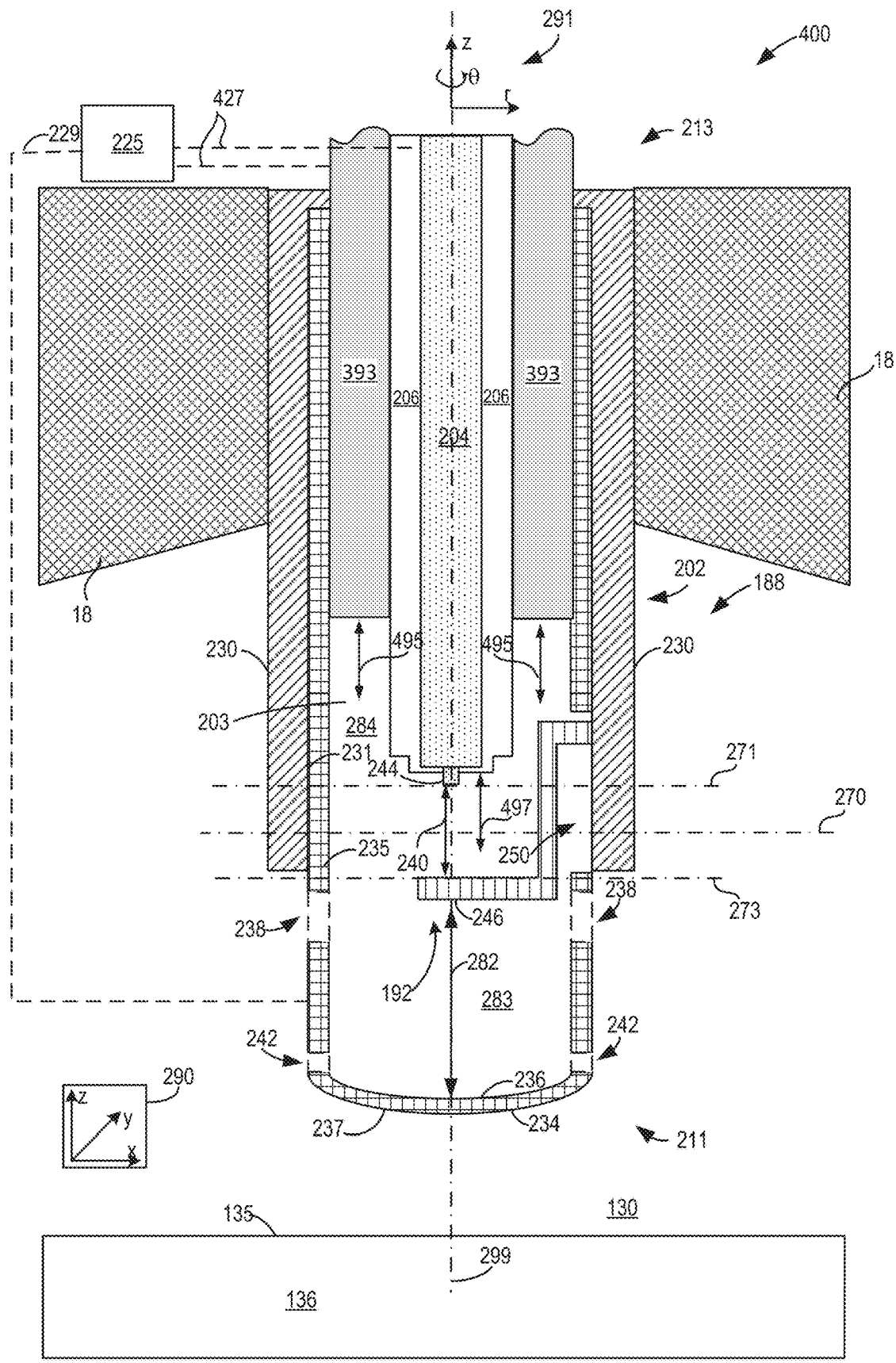
FIGS. 4A and 4B schematically show detailed views of the pre-chamber system of FIG. 2A, including a third embodiment of a moveable element.
Figure 5A:
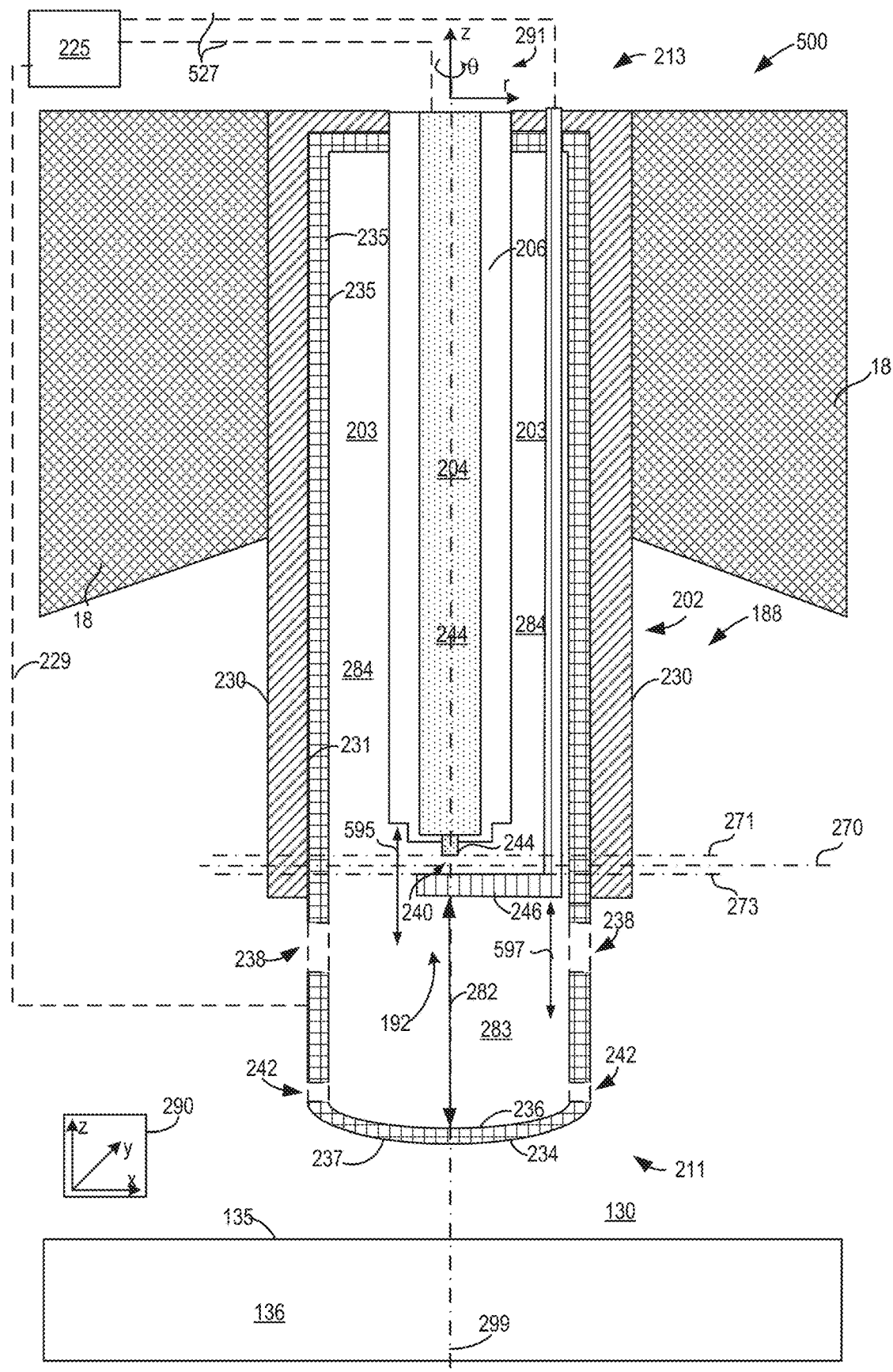
FIGS. 5A and 5B schematically show detailed views of the pre-chamber system of FIG. 2A, including a fourth embodiment of a moveable element.
Figure 5B:
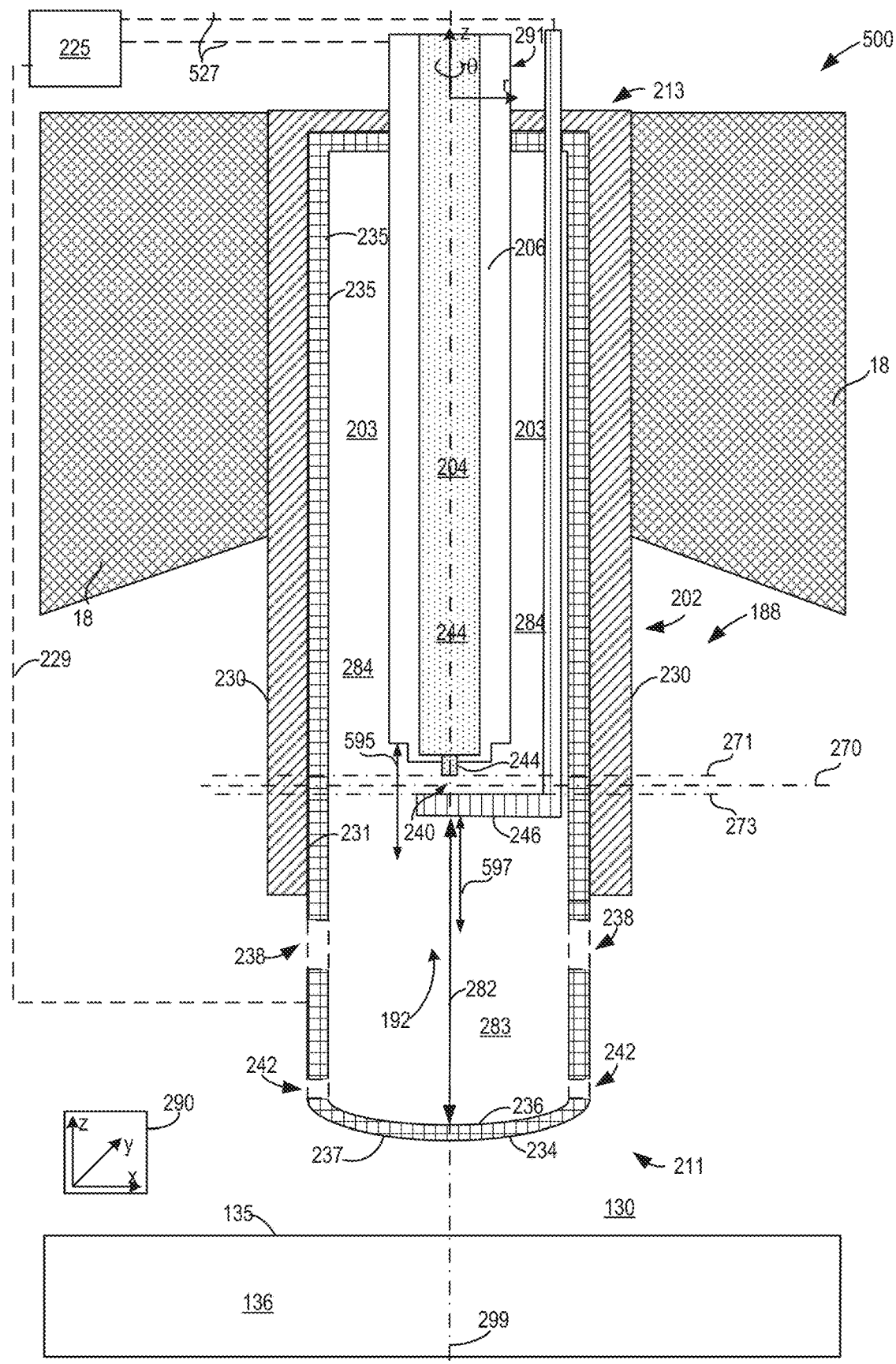

Returning to FIG. 2A, the pre-chamber system 200 further includes a center electrode 204 encased in insulation 206. Center electrode 204 may be a cylindrical electrode positioned to be coaxial with central axis 299, and insulation 206 may be a hollow cylinder coaxial with central axis 299. Center electrode 204 and insulation 206 (and in certain embodiments, ground electrode 246 too) may extend (in a positive z-direction) beyond the body 202 and pre-chamber sleeve 235 at the first end 213 (as indicated in FIGS. 4A, 5A, and 5B), whereby the center electrode 204 is conductively coupled to the ignition system 88 for receiving signal transmitted therefrom. Beyond the first end, an external housing, similar in material to pre-chamber body 202, may enclose the center electrode 204, insulation 206, and ground electrode 246 (where applicable). Although the center electrode 204, insulation 206, and ground electrode 246 may extend beyond the body 202, the internal volume 203 of the pre-chamber 188 is fluidly decoupled from these portions of the center electrode 204, insulation 206, and ground electrode 246 extending beyond the body 202 at the first end 213. In other words, fluids in the internal volume 203 are sealed from exiting the internal volume 203 at the first end 213.

Center electrode 204 includes a center electrode tip 244 conductively coupled thereto and also aligned axially along the central axis 299. Further, an inner radius of insulation 206 may be approximately equal to an outer radius of center electrode 204 so that an inner surface of insulation 206 is in direct contact with an outer surface of center electrode 204. An outer radius of insulation 206 may be smaller than an inner radius of pre-chamber sleeve 235, resulting in a radial gap between insulation 206 and pre-chamber sleeve 235. The radial gap between pre-chamber body 202 and insulation 206 may at least partially define a hollow annular cavity, in which in the internal volume 203 is arranged, forming the internal cavity of pre-chamber 188.

The pre-chamber system 200 further includes a ground electrode 246, center electrode 204 (including center electrode tip 244) and a spark gap 240. The ground electrode 246 is coupled to the interior surface 231 of pre-chamber body 202. As such, ground electrode 246 is coupled to an electrical ground via pre-chamber body 202. Further, in the example shown, ground electrode 246 extends into pre-chamber 188 and overlaps with a radial position of the center electrode tip 244, the overlapping segment of the ground electrode 246 positioned at an axial z-coordinate slightly towards the second end 211 from the center electrode tip 244, thereby forming a spark gap 240 therebetween. Accordingly, the spark gap 240 is positioned between the ground electrode 246 and the center electrode tip 244, such that upon receiving a spark advance signal from controller 12, ignition system 88 may produce an ignition spark at the spark gap 240.

In the example shown, ground electrode 246 extends radially into the internal volume 203 of pre-chamber 188 from the interior surface 231 of the pre-chamber wall towards central axis 299 by way of a slot 250 in pre-chamber sleeve 235. Slot 250 may be sized to enable pre-chamber sleeve 235 and pre-chamber cap 234 to move without contacting the ground electrode 246, for example. Further, in some cases the slot 250 may be positioned such that pre-chamber cap 234 may be actuated to a sufficient magnitude for cylinder gases to flow therethrough and into the internal volume 203, while in other cases, the pre-chamber cap 234 may be positioned such that the internal volume 203 of pre-chamber 188 may not be fluidly coupled to cylinder 130 by way of the slot 250. In other examples, the pre-chamber 188 may not include slot 250.

Figure 2E:
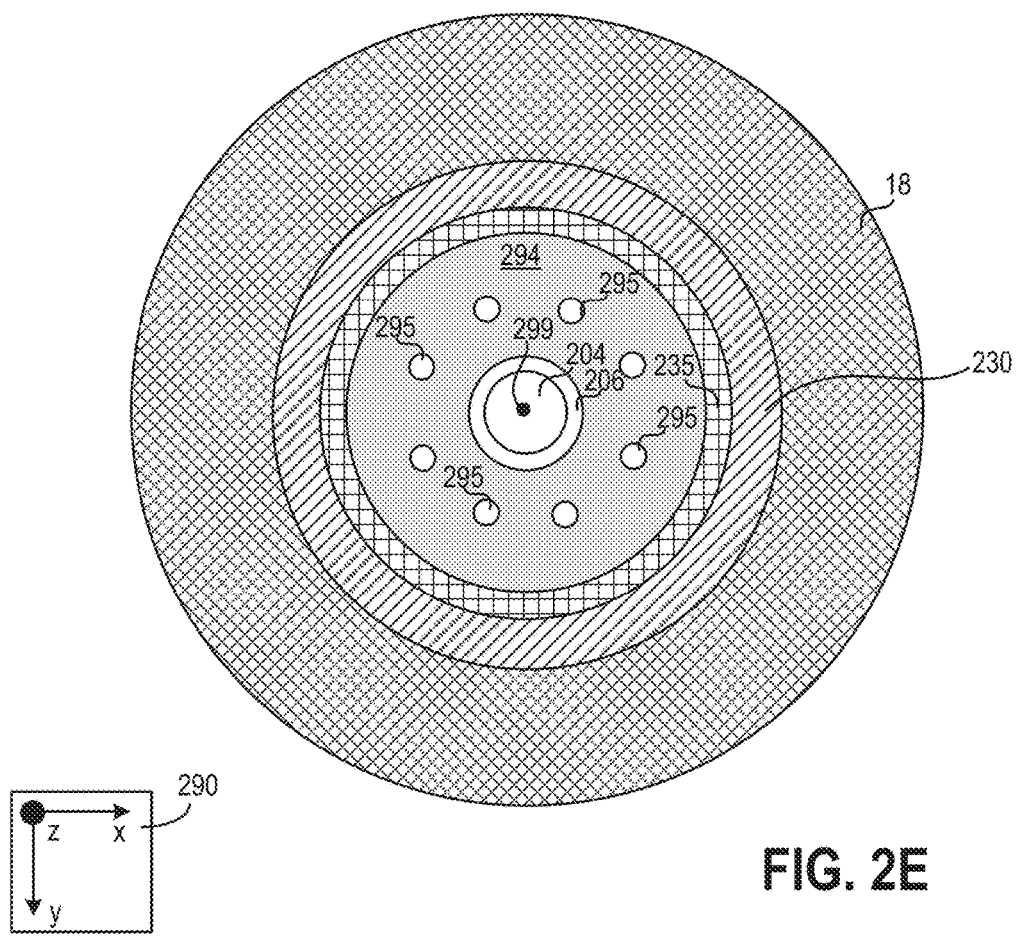
FIG. 2E schematically shows a cross-sectional view of the pre-chamber system of FIG. 2A at section 2C3.
Figure 2F:
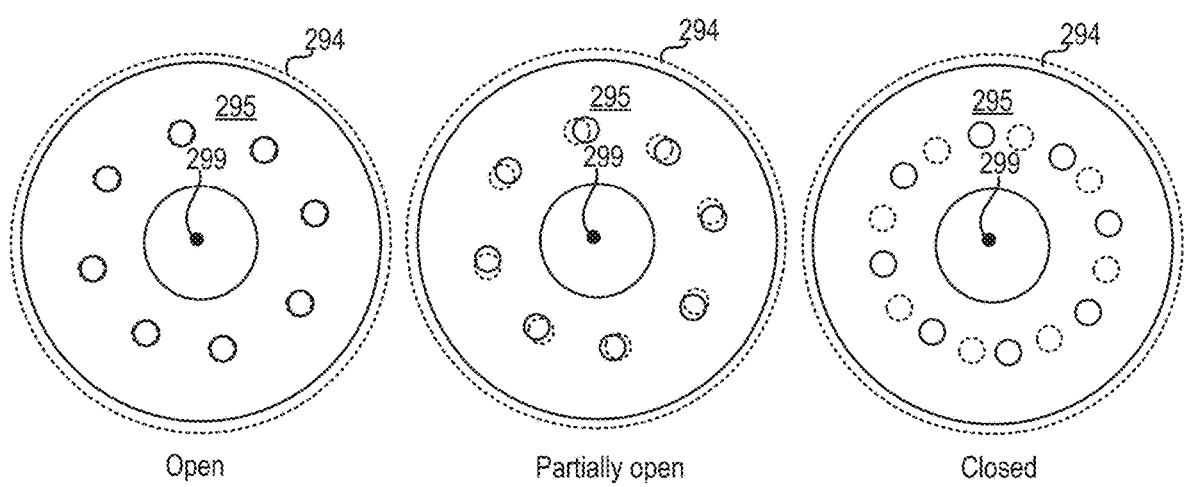
FIG. 2F schematically shows a cross-sectional view of the first example embodiment of the moveable element for the pre-chamber system of FIG. 2A at section 2C3.
Figure 2G:
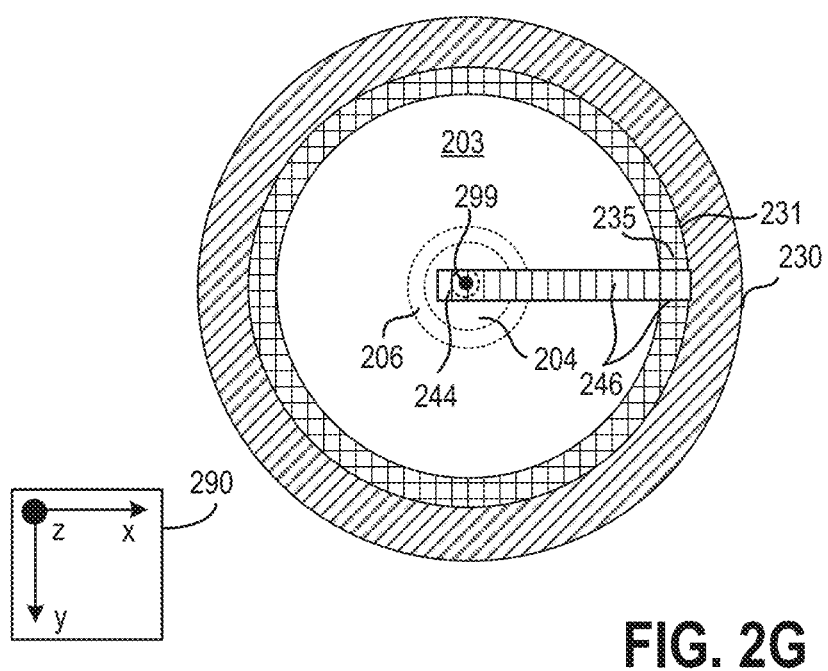
FIG. 2G schematically shows a cross-sectional view of the pre-chamber system of FIG. 2A at section 2C4.

As shown in FIG. 2A, the center electrode 204, insulation 206, internal volume 203, pre-chamber sleeve 235 (except at the slot 250), and body 202 are positioned to be concentric about the central axis 299, forming successive annular layers around the center electrode 204. For the case of a cylindrical tube-shaped pre-chamber, these successive annular layers are circular in cross-section, forming cylindrical annuli, as shown in FIGS. 2E and 2G. Turning now to FIG. 2G, it illustrates a cross-sectional view of pre-chamber system 200 taken at section 2C4, facing in the positive z-direction towards the first end 213, and coincident with a spark gap axis 270. The spark gap axis 270 is perpendicular to and transverse to the central axis 299 and passes through the spark gap 240 at the z-axial coordinate of the ground electrode 246. FIG. 2G clearly illustrates each successive cylindrical annular layer extending outwards from the central axis 299, beginning with the center electrode tip 244 and center electrode 204, insulation 206, internal volume 203, sleeve 235, and interior surface 231 and exterior surface 230 of pre-chamber body 202. Furthermore, ground electrode 246 extends radially inward from the interior surface 231 of the pre-chamber body 202 to beyond the central axis 299 and center electrode tip 244. Center electrode tip 244, center electrode 204, and insulation 206 are depicted with dotted lines since they are visible from but do not coincide with the spark gap axis 270.

For the case of other geometric (non-cylinder) shaped pre-chambers, the successive annular layers may include non-circular annular cross-sections. For example, in the case of a rectangular prism shaped pre-chamber, the successive annular layers would be square or rectangular in cross-section. Circular cylindrical pre-chambers, including the aforementioned successive annular layers with circular annular cross-sections therein, may be advantageous relative to non-circular cylindrical geometries in discouraging the formation of regions of low flow and poor mixing since the annular surfaces are smooth and continuous without sharp discontinuities, transitions, or corners. Furthermore, the rotational symmetry of circular cylindrical pre-chambers can reduce temperature and concentration gradients since mass and heat transfer path lengths of the combustible gases and ignited flame energy are symmetrical about the spark gap 240.

Returning to FIG. 2A, the internal volume 203 includes an ignition volume 283, a dead volume 284, the volume delineated by the spark gap 240 between axial positions 271 and 273, and may include one or more additional volumes 286 and 288. The ignition volume 283 includes all of the internal volume 203 that is between the spark gap 240 and the second end 211 of the pre-chamber. The dead volume 284 includes all of the internal volume 203 that is between the first end 213 and the spark gap 240 and that is fluidly coupled to the spark gap. In FIG. 2A, a spark gap axis 270, perpendicular and transverse to the central axis 299, is positioned at an axial midpoint of the spark gap 240. The spark gap 240, as delineated by the axial positions 271 and 273, is positioned between the center electrode tip 244 and the ground electrode 246, and separates the dead volume 284 from the ignition volume 283. Furthermore, the pre-chamber cap 234 is fluidly separated from the dead volume 284 by the spark gap 240. The one or more additional volumes 286 and 288 may include portions of the internal volume 203 between the first end 213 and the spark gap 240 that are not fluidly coupled to the spark gap 240. For the case of a cylindrical pre-chamber, the dead volume 284 and the additional volumes 286 and 288 are cylindrical annular volumes within the pre-chamber.

A first embodiment of a moveable element positioned in the internal volume between the first end 213 and the spark gap 240 and fluidly coupled to the dead volume 284 includes one or more valves 293 and 295. By adjusting a position of the one or more valves 293 and 295, a magnitude of the dead volume 284 can be adjusted. For example, when the valves 293 and 295 are opened (e.g. moved to a more open position), the additional volumes 286 and 288, respectively, become fluidly coupled to the dead volume 284, thereby increasing a magnitude of the internal volume between the first end 213 and the spark gap 240 that is fluidly coupled to the spark gap, and thus increasing a magnitude of the dead volume 284; in other words, opening the valves 293 and 295 incorporates the additional volumes 286 and 288 into the dead volume 284. Conversely, when the valves 293 and 295 are fully closed, the valves 293 and 295 fluidly decouple the additional volumes 286 and 288, respectively, from the spark gap, thereby decreasing the magnitude of the internal volume between the first end 213 and the spark gap 240 that is fluidly coupled to the spark gap, and thus decreasing a magnitude of the dead volume 284; in this way, the additional volumes 286 and 288 become fluidly decoupled from the dead volume 284. Furthermore, opening or closing the one or more valves 293 and 295 changes the magnitude of the dead volume 284 without changing the ignition volume 283, and without changing the sum of the dead volume 284, ignition volume 283 and additional volumes 286 and 288. Further still, opening or closing the one or more valves 293 and 295 changes the magnitude of the dead volume 284 while changing the magnitude of the internal volume 203 that is fluidly coupled to the spark gap 240. In this way, moving the moveable element changes the relative magnitude of the dead volume 284 as compared to the internal volume 203; in other words, moving the moveable element changes a ratio of the dead volume 284 to the internal volume 203.

Under certain conditions, all of valves 293 and 295 may be opened, to fluidly couple each additional volume 286 and 288 with the dead volume 284. In other cases, valves 293 may be opened while valves 295 may be closed so that additional volume 286 becomes fluidly coupled to the dead volume 284 while additional volume 288 becomes fluidly decoupled from the dead volume 284. In some instances, the valves 293 and 295 may be opened simultaneously, while in other instances, valves 293 and 295 may be adjusted sequentially. In the example of FIG. 2E, four of the eight valves 295 may be opened while other four valves 295 remain closed. In this way, a flow rate of combustion gases to the additional volume 288 may be reduced, while maintaining rotational symmetry of the open valves 295 about axis 299.

As illustrated in FIG. 2A, the additional volumes 286 and 288 may be separated from each other and from the dead volume 284 by partitions 292 and 294. Furthermore, by arranging the valves 293 and 295 at the partitions 292 and 294, respectively, the magnitude of the dead volume 284 can be adjusted in a stage-wise manner, for example, by opening the one or more valves 293 while fulling closing valves 295. In some examples, as described with reference to FIG. 2F, the partitions 292 and 294 may be incorporated into the design of valves 293 and 295.

Valves 293 and 295 may be actuated by actuator 225 to adjust their % opening positions. Actuator 225 may be communicatively coupled to the controller 12, such that the actuator 225 may send and receive signals 227 to the valves 293 and 295, responsive to various engine operating conditions. Actuator 225 may further send and receive signals 229 to other moveable elements such as pre-chamber cap 234), responsive to various engine operating conditions. Actuator 225 may include a solenoid, an electric motor, a pneumatic actuator, a vacuum actuator, a hydraulic actuator, or the like. Actuator 225 may be directly coupled to valves 293 and 295, and may thereby act directly on pre-chamber sleeve 235 or may be indirectly coupled via a linkage, a cam, etc. In the example of the pre-chamber system 200, actuator 225 may adjust the valves 293 and 295 between a fully closed and a fully open position, including partially open positions therebetween, to adjust valve opening size. In some examples, actuator 225 may continuously vary the position of valves 293 and 295 between the fully closed and fully open positions based on engine conditions, such as the effective compression ratio and intake valve close (IVC) timing, engine load, coolant temperature, engine speed, EGR, VCT, VVT, coolant temperature, and/or air temperature.

Although two additional volumes 286 and 288 are shown in FIG. 2A, a pre-chamber system 200 may include only one, or more than two additional volumes by incorporating additional partitions and arranging additional valves thereat. In one example, each of the additional volumes may be equal in volume, with the axial distance (e.g. z-axis) between successive partitions (e.g., 292 and 294) being uniform across each additional volume. Furthermore, some or all of the partitions may be positioned closer together, to configure the additional volumes smaller, so that the magnitude of the dead volume can be adjusted more gradually, when each successive stage of valves is opened; alternately, some or all of the partitions may be positioned farther apart, so as to configure the additional volumes larger, so that the magnitude of the dead volume can be adjusted more coarsely, when each successive stage of valves is opened. In another example, a size of the additional volume at each stage may decrease as their axial (z-axis) position becomes closer to the first end 213. In other words, the partitions may be positioned further apart (e.g., larger additional volume) when closer to the spark gap 240, while the partitions may be spaced more closely together when closer to the first end 213. In this way, a magnitude of the dead volume 284 may be adjusted more coarsely, and then more gradually, as successive stages of valves 293 and 295 closer to the first end 213 are opened; FIG. 2A illustrates a simple example, where additional volume 286 (farther from the first end 213) is larger than additional volume 288 (closer to the first end 213).

As illustrated in FIG. 2A, a partition may include one moveable element (e.g., partition 292 includes one valve 293) or may include a plurality of moveable elements (e.g., partition 294 includes a plurality of valves 295). Including a greater number of moveable elements at a partition may allow for higher flow fluid flow rates through the partition resulting in faster mixing, and higher rates of mass and heat transfer between the dead and additional volumes on either side of the partition. Similarly, increasing a size of the valve openings can aid in increasing fluid flow rates through the partitions, resulting in faster mixing between the dead and additional volumes. In one example, a total cross-sectional area of the valve openings may be greater than a threshold cross-sectional area of the partition, in order to achieve a threshold fluid flowrate through the openings when the valves are opened.

Turning to FIG. 2E, it illustrates a cross-sectional view of FIG. 2A at section 2C3. In the example of FIG. 2E, the valves 295 are depicted in a fully open position, represented by circular valve openings; however, in other examples, the valve openings may include other geometries. The valves 295 may be positioned in a rotationally symmetric arrangement at partition 294 about the central axis 299, as shown in FIG. 2E (a cross-sectional view of FIG. 2A at section 2C3). As such, when the valves 295 are opened, the additional volume 288 may be fluidly coupled to the dead volume 284 symmetrically about central axis 299, which can aid in increasing heat and mass transfer rates uniformly between the dead and additional volume, reducing dead spots (e.g., low mixing rates), and reducing a mixing time of the fluids in the dead volume 284 and the additional volume 288 incorporated therein.

The valves 293 and 295 may include various types of compact fluid flow regulating valves, including a poppet valve, gate valve, spool valve, solenoid valves, needle valves, and the like, and may be actuated hydraulically, pneumatically, by a solenoid, and the like, by way of actuator 225. Turning now to FIG. 2F, it illustrates cross-sectional view of an example where the valves 293 and/or 295 include a rotating disk valve. As shown in FIG. 2F, the rotating disk valve includes a pair annular disks that are positioned adjacently in face-sharing contact that can slide and rotate relative to one another about the central axis 299. Each of the annular disks may be shaped identically and may each include a plurality of openings therein. An outer diameter of the annular disks may correspond to the inner surface diameter of sleeve 235, while an inner diameter of the annular disks may correspond to the outer diameter of the center electrode insulation 206. As such, there may be sufficient sealing between the insulation 206 and the annular disks and between the sleeve 235 and the annular disks such that negligible fluid passes therethrough. In this way, the rotating disk valve configuration may incorporate both the partition 294 and the valve 295 whereby one of the annular disks may represent partition 294 and the other annular disk may represent the valve 295. The rotating disk valve is fully opened when the two annular disks are rotated so that the openings therein are mutually aligned, as shown by the leftmost representation in FIG. 2F. When the annular disks are rotated such that the openings of each annular disk are partially aligned, the rotating disk is partially opened, as illustrated by the center representation in FIG. 2F. Finally, when the annular disks are rotated such that the openings of each annular disk are misaligned, the rotating disk is fully closed, as shown by the rightmost representation in FIG. 2F.

The dimensions of the openings valves 293 and 295 may be large enough so that upon fully opening the valves, a flow rate of fluids therethrough can be high enough during ignition cycles of the pre-chamber 200 to rapidly mix the fluids on either side of the partitions 292 and 294. In one example, a diameter of the openings may be selected such that a sum total cross-sectional area of the valve openings is greater than a lower threshold percentage of the total cross-sectional area of each partition. In one example, the lower threshold percentage of the total cross-sectional area may include 5%. Furthermore, the valve openings may be dimensioned such that the lower threshold percentage of the total cross-sectional area may be reached by partially opening the valves; thus, a higher percentage of the total cross-sectional area may be reached by fully opening the valves 293 and 295. Further still, the valve openings may be dimensioned such that the sum total cross-sectional area of the valve openings is less than an upper threshold percentage of the total cross-sectional area of each partition 292 and 294, in order to preserve a structural integrity and sealing capability of the partitions so that the internal volumes on either side of the partitions are fluidly decoupled when the valves 293 and/or 295 are fully closed. In one example, the upper threshold percentage of the total cross-sectional area may include 30%.

Thus, during the engine cylinder compression stroke, a mixture, which may include one or more of intake air, exhaust gas recirculate (EGR), fuel, and combustion byproducts may flow into the ignition volume 283 of pre-chamber 188 from cylinder 130 via the plurality of openings 242 and/or the plurality of openings 238 (e.g., due to a pressure difference across the plurality of openings 242 and the plurality of openings 238), where the combustible air-fuel mixture may be ignited via a spark at spark gap 240. Spark ignition of the air-fuel mixture inside the pre-chamber generates high-temperature gas/flame jets that flow out of pre-chamber 188 to cylinder 130 by way of the plurality of openings 242 and 238.

In particular, the smaller orifice opening size of pre-chamber 188 when the pre-chamber cap 234 is retracted towards the first end 213 may provide enhanced ignition at higher loads, which may result in increased cylinder power and fuel savings. Conversely, at lower loads, the pre-chamber cap 234 may be extended away from the first end 213, enabling a larger orifice opening size to provide enhanced ignition. Furthermore, by adjusting the orifice opening size, flow rates into the internal volume 203 may be enhanced for various engine conditions while maintaining combustion stability. For example, during higher loads, more air and fuel may be arranged in the cylinder 130. As such, a smaller orifice opening area may be used while still providing a desired amount of air and fuel to the internal volume 203 of the pre-chamber 188 to generate a desired flame jetting. During lower loads, less air and fuel may be arranged in the cylinder 130. Furthermore, thermal stresses on the pre-chamber igniter 192 may be reduced. As such, a larger orifice opening area may be used to provide the desired amount of air and fuel to the internal volume 203 of the pre-chamber 188.

Additionally, at lower loads, a flame kernel produced by the pre-chamber igniter 192 may not be stable due to increased amounts of residual burned gas within the internal volume 203 of the pre-chamber 188. If the orifice opening size is small (e.g., when the pre-chamber cap 234 is retracted towards the first end 213), the flame kernel may be quenched (e.g., extinguished) as the flame kernel passes through the small orifice openings. However, with increased orifice opening size (e.g., when the pre-chamber cap 234 is extended away from the first end 213), an increased amount of fresh air from the cylinder 130 may enter an internal volume 203 of the pre-chamber 188 during the compression stroke of a four stroke engine cycle. Thus, the flame kernel may have increased stability within the internal volume 203 of pre-chamber 188. Furthermore, increased orifice opening sizes decreases the probability of the flame kernel from quenching as the flame flows through the orifice. At higher loads, stability of the flame kernel is increased due to increased gas pressures and increased temperatures. The probability of quenching is also decreased as the temperature of a material (e.g., metal) of the pre-chamber cap 234 and pre-chamber sleeve 235 is increased. The small orifice sizes may further contribute to more robust flame jets at higher loads, which may promote enhanced combustion in the cylinder 130.

Positioning the spark gap 240 at the central axis 299 and configuring the openings 238 and 242 as well as the internal volume 203 to be rotationally symmetric about the spark gap 240 advantageously aids in distributing a more uniform (e.g., more homogeneous composition and temperature) air-fuel mixture surrounding the spark gap 240. Additionally, following ignition of the air-fuel mixture, the rotationally symmetric configuration of the pre-chamber 188 components can aid in more uniformly distributing the ignition flame jets throughout the ignition volume 283 and directing the ignition flame jets to the cylinder 130. More efficiently directing and distributing the ignition flame jets to the ignition volume includes utilization of a higher fraction of the spark energy towards fuel ignition, and decreasing an amount of wasted spark energy misdirected to pre-chamber walls, or to the dead volume 284 between the first end 213 and the spark gap axis 270. Consequently, upon spark generation, higher energy ignition flame jets generated at the ignition volume 283 can be more effectively directed to the cylinder 130, resulting in more robust combustion.

After each combustion event, the pre-chamber is filled with residual burned gas (e.g., air-fuel combustion byproducts). During the next engine intake stroke as piston 136 moves towards BDC, fresh air-fuel mixture is drawn into the cylinder 130. However, very little of the combustible air-fuel mixture enters the pre-chamber 188 through the openings 238 and 242, until the compression stroke when the piston 136 moves towards TDC. If the dead volume 284 greater than a lower threshold dead volume and less than an upper threshold dead volume, the pressure driving the air-fuel mixture entering the pre-chamber 188 displaces the residual burned gas in the ignition volume 283, and pushes the residual burned gas into the dead volume 284. When the dead volume 284 is less than the lower threshold dead volume, a portion of the residual burned gas remains in the ignition volume 283, and is not displaced by the entering air-fuel mixture. Furthermore, when the dead volume 284 is less than the threshold dead volume, the amount of air-fuel mixture entering the pre-chamber 188 may be lower. Due to the presence of the residual burned gas in proximity to the spark gap 240 and the lower amount of air-fuel mixture at the ignition volume 283, the resulting combustion from a spark event may be of poor quality (e.g., lower energy flame jets, lower density flame kernel, and the like) and a likelihood of engine misfiring increases. When the dead volume 284 is greater than an upper threshold dead volume, the residual burned gas may be displaced by the entering air-fuel mixture, and the initial combustion resulting from the spark event may be of higher quality (e.g., higher energy flame jets, higher density flame kernel, and the like); however, the accumulation of pressure following the combustion event is lower, which results in lower energy flame jets that may fail to extend into the engine cylinder 130 and ignite the air-fuel mixture in the engine cylinder 130.

The lower threshold dead volume and the upper threshold dead volume may both depend on engine operating conditions such as effective compression ratio, IVC timing, engine speed, load, EGR, VCT/VVT, coolant temperature, and/or air temperature. In one example, the lower threshold dead volume and the upper threshold dead volume may vary as a function of IVC timing. In particular, the lower threshold dead volume and the upper threshold dead volume may increase as the IVC timing moves further from BDC, because effective compression ratio decreases as the IVC timing shifts to earlier from BDC or shifts to later from BDC (e.g., IVC timing moves further away from BDC). In other words, in response to IVC timing moving earlier from BDC or moving later from BDC (e.g., IVC timing moves further away from BDC), controller 12 (by way of actuator 225) may move the moveable element in the pre-chamber internal volume 203 to increase the dead volume 284. Thus, in the pre-chamber system 200, controller 12 may open one or more of valves 293 and 295 to increase the dead volume 284 responsive to the IVC timing moving earlier from BDC or moving later from BDC. Conversely, responsive to an increase in the dead volume 284, the controller 12 may adjust the IVC timing by moving the IVC timing earlier or later from BDC (e.g., controller 12 changes IVC timing to be further away from BDC).

In other examples, the lower and upper threshold dead volume may represent a lower and upper threshold fractional dead volume, where the fractional dead volume is the ratio of the dead volume 284 to the total pre-chamber internal volume 203.

As previously described, the geometry of the dead volume 284 aids in more effectively purging the residual burned gases from the ignition volume 283 by the incoming fuel-air mixture. Because the cross-section of the dead volume 284 is annular in shape the residual burned gases from the ignition volume 283 can flow as an annular plug, with reduced back-mixing, resulting in a faster and more thorough purging of the residual burned gases from the ignition volume 283. Faster purging dynamics (e.g., decreased time to purge the residual burned gas from the ignition volume 283) allows for more robust engine operation, and reduces the likelihood of slow or incomplete residual burned gas purging leading to engine misfires or poor combustion quality. Furthermore, because the dead volume 284 is rotationally symmetric about the central axis 299, purging of the residual burned gases from the ignition volume 283 occurs uniformly across the dead volume 284. Additionally, as described above, when the dead volume 284 has a circular cylindrical cross-section, dead spots where fluid velocity is lower are discouraged, which further enhances purging dynamics of the residual burned gases from the ignition volume 283. The rotational symmetry of the additional volumes 286 and 288 as well as the rotational symmetry of the moveable elements in the internal volume 203 also allow for increased purging dynamics since moving the moveable elements (e.g., opening and closing the valves 293 and 295 in the case of pre-chamber system 200) responsive to engine operating conditions preserves the rotational symmetry of the dead volume 284 when the additional volumes 286 and/or 288 are incorporated into or decoupled from the dead volume 284.

Figure 3A:
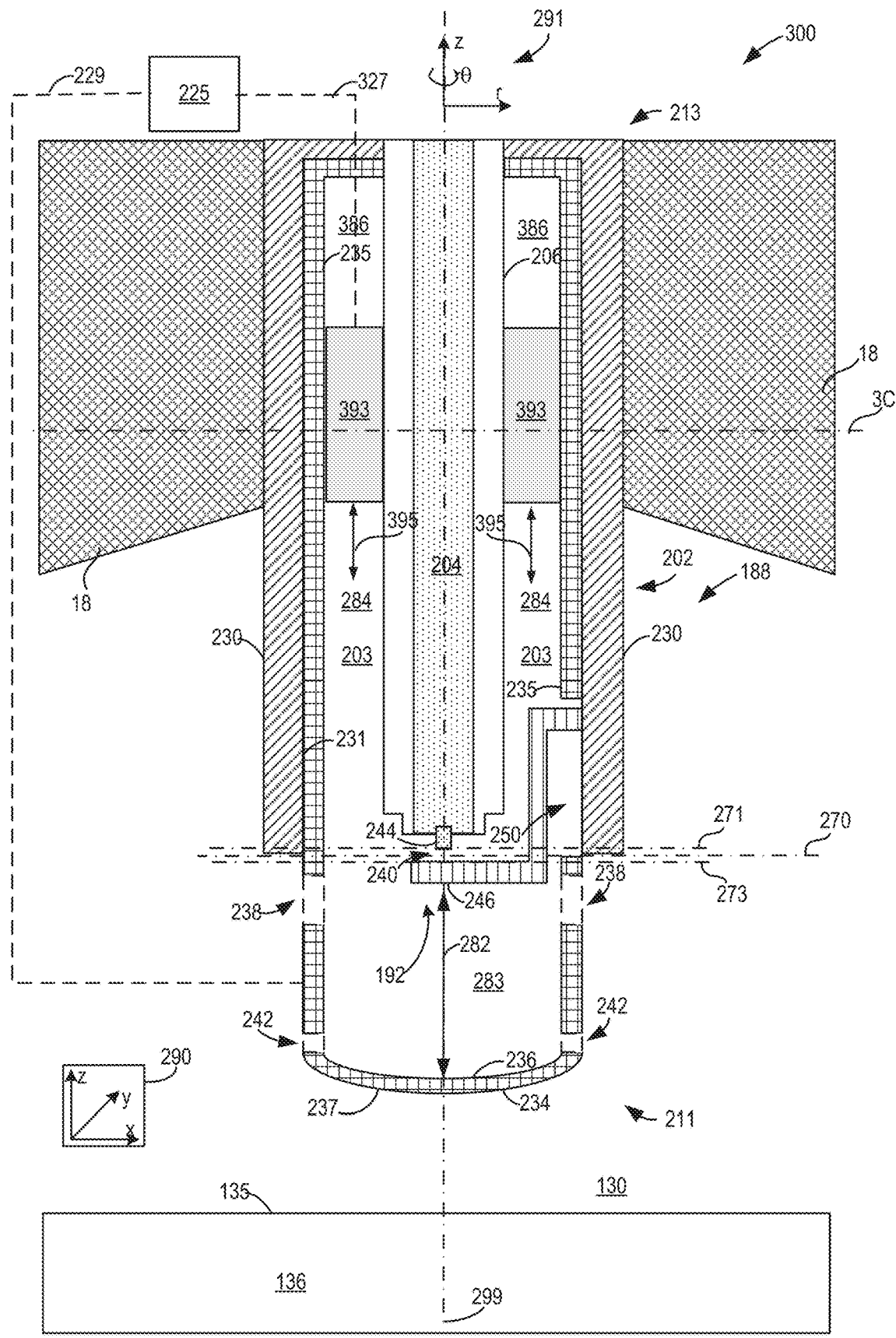
FIGS. 3A, 3B, and 3D schematically show detailed views of the pre-chamber system of FIG. 2A, including a second embodiment of a moveable element.
Figure 3B:
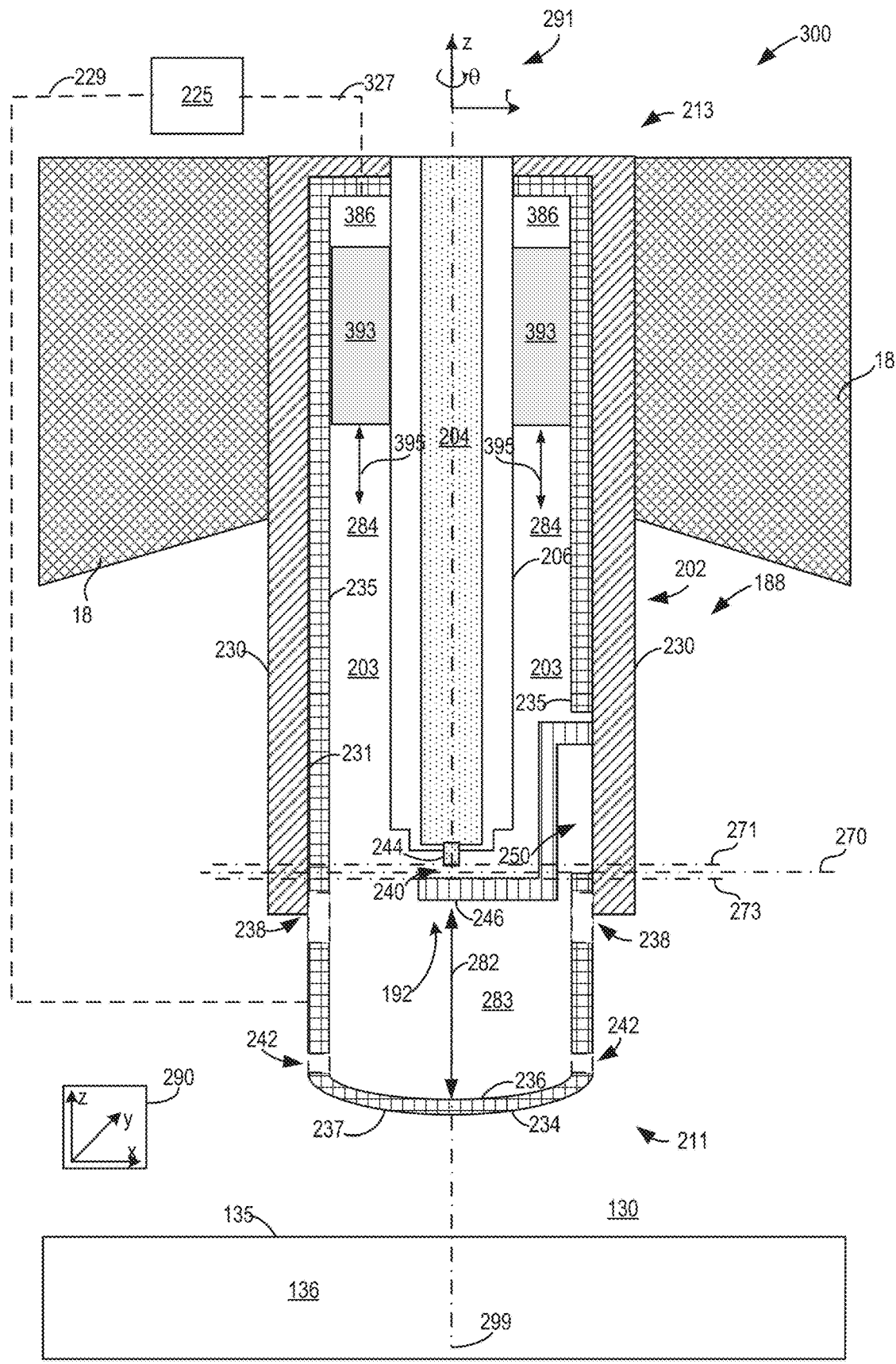
Figure 3C:
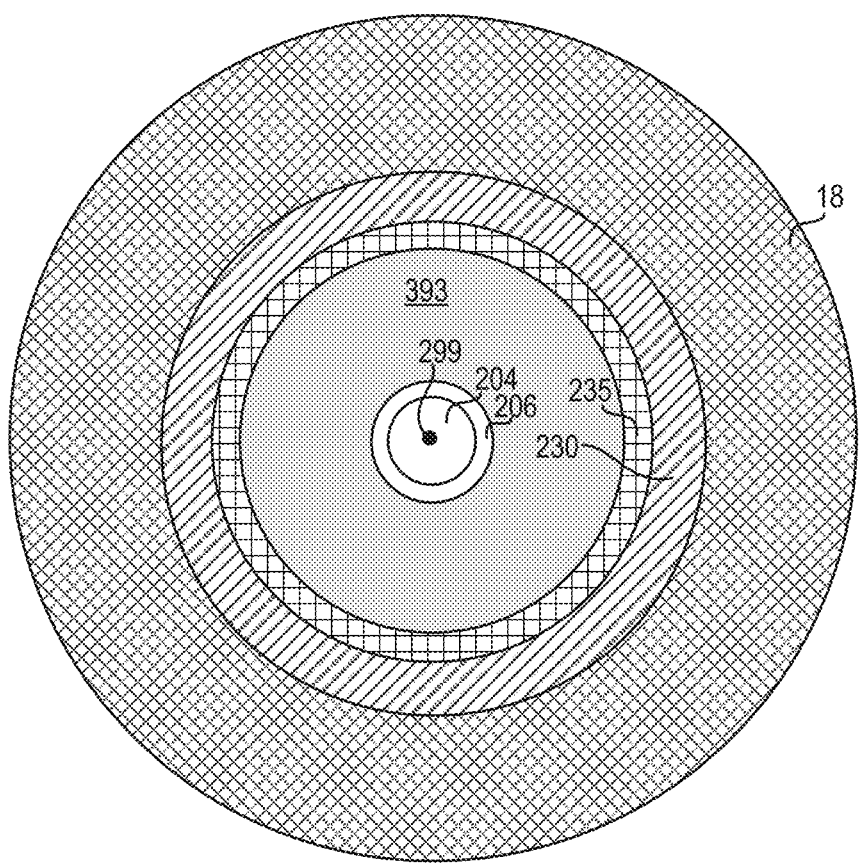
FIG. 3C schematically shows a cross-sectional view of the pre-chamber system of FIG. 3A at section 3C.
Figure 3C:
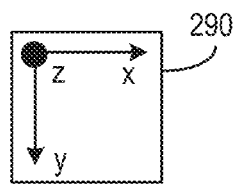
Figure 3D:
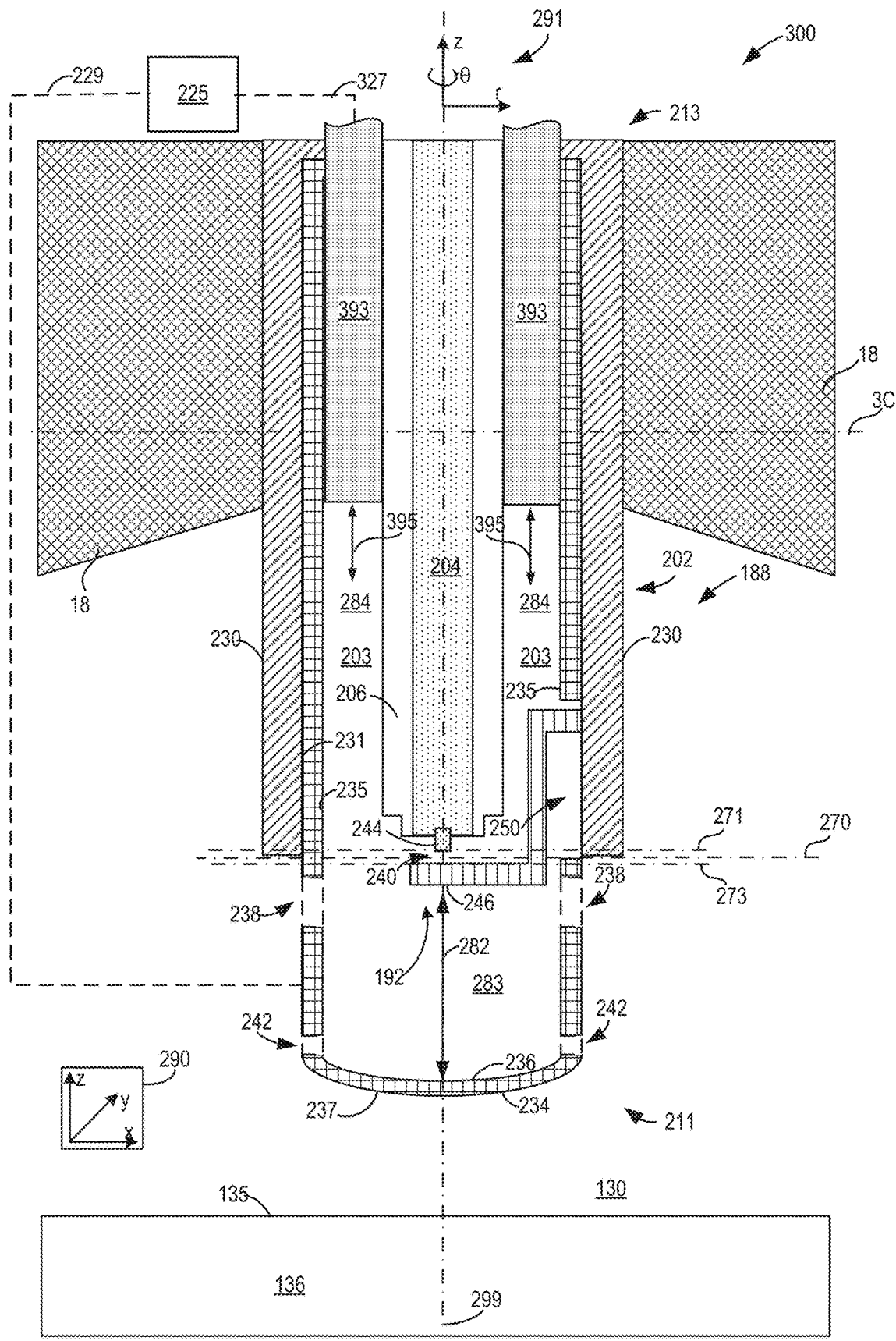

Turning now to FIGS. 3A, 3B, and 3D, they show a longitudinal cross-sectional view of a pre-chamber system 300. Pre-chamber system 300 is similar to pre-chamber system 200. As such, components previously introduced in FIG. 2A are numbered identically in FIGS. 3A, 3B, and 3D. In the pre-chamber system 300, the pre-chamber internal volume 203 includes the ignition volume 283, the dead volume 284, and may further include the additional volume 386. The ignition volume 283 includes the portion of the internal volume 203 that is positioned between the spark gap 240 and the second end 211, the dead volume 284 includes the portion of the internal volume 203 that is positioned between the first end 213 and the spark gap 240 that is fluidly coupled to the spark gap 240, and the additional volume 386 includes the portion of the internal volume 203 that is positioned between the first end 213 and the spark gap 240 that is not fluidly coupled to the spark gap 240.

A second embodiment of a moveable element positioned in the internal volume 203 between the first end 213 and the spark gap 240 and fluidly coupled to the dead volume 284, includes an annular plug 393. The position of the annular plug 393 is adjustable, as indicated by the bidirectional arrows 395. FIG. 3A depicts the pre-chamber system 300 including the annular plug 393 positioned more towards the second end 211, while FIG. 3B depicts the pre-chamber system 300 including the annular plug 393 positioned more towards the first end 213. Adjusting a position of the annular plug 393 includes moving the annular plug 393 in a first direction towards the first end 213 (e.g., away from the second end 211) to increase a magnitude of the dead volume 284, and moving the annular plug 393 in a second direction towards the second end 211 (e.g., away from the first end 213) to decrease a magnitude of the dead volume 284. Moving the annular plug 393 in the first direction concomitantly decreases a magnitude of the additional volume 386 and increases a volume of the dead volume 284, while moving the annular plug 393 in the second direction concomitantly increases a magnitude of the additional volume 386 and decreases a volume of the dead volume 284. Furthermore, moving the annular plug 393 changes the magnitude of the dead volume 284 and the additional volume 386 without changing a magnitude of the ignition volume 283 and without changing a magnitude of the internal volume 203. The annular plug 393 may be dimensioned such that its outer diameter coincides with the inner surface of the pre-chamber sleeve 235, and its inner diameter coincides with the surface of the insulation 206. In this way a cross-section of the annular plug 393 fills the cross-section of the internal volume 203, as illustrated in FIG. 3C (cross-sectional view of the pre-chamber system 300 at section 3C). An axial length (e.g., parallel to the z-coordinate) of the annular plug 393 may be greater than a lower threshold length and less than an upper threshold length. When the annular plug 393 is greater than the lower threshold length, a structural integrity of the annular plug 393 can be maintained so that fluid isolation of the additional volume 386 from the dead volume 284 can be maintained while being subject to temperature and pressure fluctuations in the pre-chamber 188 during engine operation. When the annular plug 393 is less than the upper threshold length, a volume of the annular plug 393 is smaller, thereby enabling a larger range of motion for the annular plug 393 within the internal volume 203. Similarly, reducing a length of the annular plug 393 can advantageously increase an internal volume 203 for a given pre-chamber body 202, and increases a range of axial motion of the annular plug 393 within the internal volume 203. In this way, an annular plug 393 having a shorter length may be able to effect larger degrees of change in the magnitude of the dead volume 284 (and additional volume 386) through movement of the annular plug 393.

In the example of FIG. 3D, the annular plug 393 is shown having a longer axial length that extends beyond the first end 213. In particular, when the axial length of the annular plug 393 extends beyond the first end 213, the internal volume 203 does not include additional volume 386. Beyond the first end, an external housing, similar in material to pre-chamber body 202, may enclose the annular plug 393, and any other components extending beyond the first end 213, such as center electrode 204, insulation 206, and the like. Although the annular plug 393 may extend beyond the body 202 at first end 213, the internal volume 203 of the pre-chamber 188 is fluidly decoupled from these portions of the annular plug 393 extending beyond the body 202 at the first end 213. In other words, fluids in the internal volume 203 are sealed from exiting the internal volume 203 at the first end 213.

Accordingly, in the example of FIG. 3D, adjusting the position of the annular plug 393 changes a magnitude of the dead volume 284 while changing a magnitude of the total internal volume 203. For example, moving the annular plug 393 in a first direction towards the first end 213 (e.g., away from the second end 211) increases a magnitude of the dead volume 284 and increases a magnitude of the total internal volume 203. Furthermore, moving the annular plug 393 in a second direction towards the second end 211 (e.g., away from the first end 213) decreases a magnitude of the dead volume 284 while decreasing a magnitude of the total internal volume 203. Further still, the change in the magnitude of the dead volume 284 arising from moving the annular plug 393 is equivalent to the change in the magnitude of the total internal volume 203 arising from moving the annular plug 393. As such, a ratio of the dead volume 284 to the total internal volume 203 changes when moving the moveable element in the pre-chamber system 300 of FIG. 3D. Accordingly, when the annular plug 393 is moved towards the second end 211 (e.g., away from the first end 213), dead volume 284 occupies a smaller fraction of total internal volume 203; similarly, when the annular plug 393 is moved away from the second end 211 (e.g., towards the first end 213), the dead volume 284 occupies a larger fraction of total internal volume 203.

In the examples of FIGS. 3A, 3B, and 3D, the annular plug 393 may be manufactured to have a sliding or slip fit tolerance when positioned in the internal volume 203 so that the annular plug 393 may be moved towards the first end 213 or towards the second end 211. In some cases, a surface treatment may be applied to the inner and/or outer diameter surfaces of the annular plug in sliding contact with the insulation 206 and pre-chamber sleeve 235, respectively, to aid in providing a smoother sliding motion of the annular plug 393. The annular plug 393 may be solid or hollow and may be constructed of a material such as cast iron, stainless steel, aluminum, carbon fiber, magnesium, or the like. Constructing the annular plug 393 of a similar material to the pre-chamber sleeve 235 and/or body 202 may aid in maintaining a consistent amount of expansion and contraction across these elements with fluctuating temperatures in the pre-chamber 188. A hollow annular plug 393 may be advantageous because a mass of the annular plug 393 may be reduced, and thus, a decreased amount of energy may be consumed when moving the annular plug 393. A solid annular plug 393 may be advantageous because of its higher heat capacity, thereby reducing temperature fluctuations in the annular plug 393, which can aid in reducing expansion and contraction of the annular plug 393.

Annular plug 393 may be movable along central axis 299 by way of actuator 225. For example, actuator 225 may adjust the position of the annular plug 393 in a direction that is parallel to central axis 299, thereby adjusting a magnitude of the dead volume 284 and the additional volume 386, without adjusting the size of the ignition volume 283. Actuator 225 may be directly coupled to the annular plug 393, and may thereby act directly on the annular plug 393 or may be indirectly coupled thereto by way of a linkage, a cam, etc. In the example shown, the annular plug 393 is coupled to actuator 225 by way of a linkage 327, and thus, movement of the linkage may be transferred to the annular plug 393. In some examples, actuator 225 may continuously vary the position of the annular plug 393 to adjust a magnitude of the dead volume 284, based on engine conditions such as the effective compression ratio and intake valve close (IVC) timing, engine load, coolant temperature, engine speed, EGR, VCT, VVT, coolant temperature, and/or air temperature. In other examples, actuator 225 may vary the position of the annular plug 393 in a step-wise manner based on engine conditions such as the effective compression ratio and IVC timing, engine load, coolant temperature, engine speed, EGR, VCT, VVT, coolant temperature, and/or air temperature.

In other examples, an axial position of the annular plug 393 may be adjusted responsive to a pressure in the ignition volume 283 and/or dead volume 284. During cylinder compression, when fresh air-fuel mixture is delivered into the ignition volume by way of openings 238 and 242, and residual burned gases may be displaced from the ignition volume 283 into the dead volume 284, the pressure at the ignition volume 283 and/or dead volume 284 may be higher. Responsive to the increase in pressure at the ignition volume 283 and/or dead volume 284, the annular plug 393 may be pushed towards the first end 213. On the other hand, following a combustion event and/or during cylinder expansion (e.g., when the piston 136 is moving towards BDC), the pressure at the ignition volume 283 and/or dead volume 284 may be lower. Responsive to the decrease in pressure at the ignition volume 283 and/or dead volume 284, the annular plug 393 may be pulled towards the second end 211.

In one example, in response to IVC timing moving earlier from BDC or moving later from BDC, controller 12 (by way of actuator 225) may move the moveable element in the pre-chamber internal volume 203 to increase the dead volume 284. Thus, in the pre-chamber system 300, controller 12 may adjust the position of the annular plug 393 towards the first end 213 to increase the dead volume 284 responsive to the IVC timing moving further away from BDC (e.g., moving earlier from BDC or moving later from BDC). Furthermore, controller 12 may adjust the position of the annular plug 393 away from the first end 213 to decrease the dead volume 284 responsive to the IVC timing moving towards BDC. Conversely, responsive to an increase in the dead volume 284, the controller 12 may adjust the IVC timing by moving the IVC timing earlier or later from BDC.

Figure 4B:
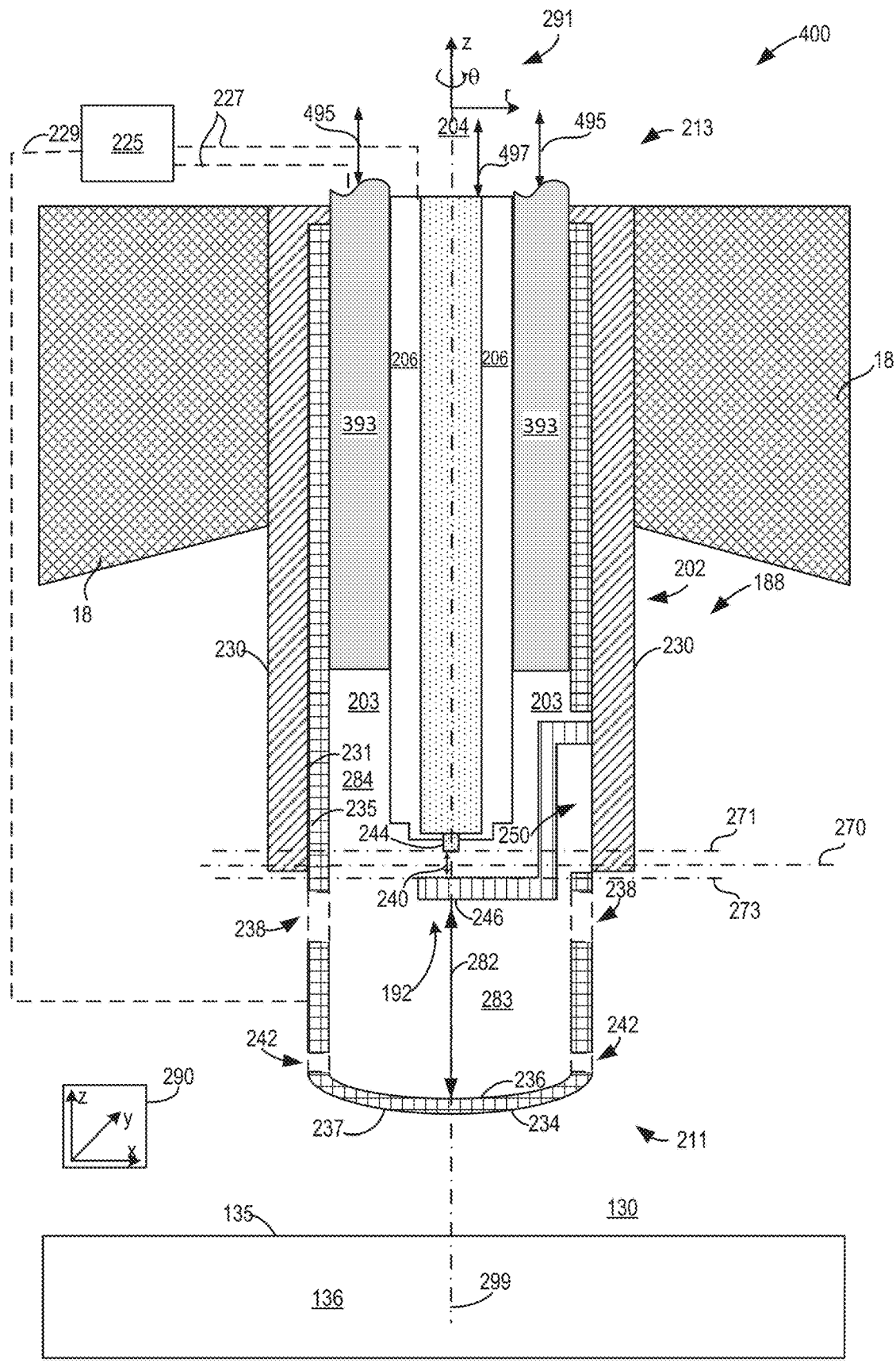

Turning now to FIGS. 4A and 4B, they show a longitudinal cross-sectional view of a pre-chamber system 400. Pre-chamber system 400 is similar to pre-chamber system 200 and pre-chamber system 300. As such, components previously introduced in FIGS. 2A, 3A, 3B, and 3D are numbered identically in FIGS. 4A and 4B. In the pre-chamber system 400, the pre-chamber internal volume 203 includes the ignition volume 283, the dead volume 284, and may include an additional volume 486. The ignition volume 283 includes the portion of the internal volume 203 that is positioned between the spark gap 240 and the second end 211, the dead volume 284 includes the portion of the internal volume 203 that is positioned between the first end 213 and the spark gap 240 that is fluidly coupled to the spark gap 240, and the additional volume 486 includes the portion of the internal volume 203 that is positioned between the first end 213 and the spark gap 240 that is not fluidly coupled to the spark gap 240.

A third embodiment of a moveable element positioned in the internal volume 203 between the first end 213 and the spark gap 240 and fluidly coupled to the dead volume 284 includes the annular plug 393, the center electrode 204 (including center electrode tip 244), and insulation 206. The positions of the annular plug 393, the center electrode 204 (and insulation 206) are adjustable, as indicated by the bidirectional arrows 495 and 497, respectively. FIG. 4A depicts the pre-chamber system 400 including the annular plug 393, center electrode 204, and insulation 206 positioned more towards the first end 213, while FIG. 4B depicts the pre-chamber system 400 including the annular plug 393, center electrode 204, and insulation 206 positioned more towards the second end 211. In pre-chamber system 400, moving (e.g., adjusting an axial position of) the annular plug 393, center electrode 204, and insulation 206 changes a magnitude of the total pre-chamber volume 203 without changing a magnitude of the dead volume 284. As such, a ratio of the dead volume 284 to the total internal volume 203 changes when moving the moveable element in pre-chamber system 400. Accordingly, FIG. 4A depicts a position where dead volume 284 occupies a smaller fraction of total internal volume 203, and FIG. 4B depicts a position where dead volume 284 occupies a larger fraction of total internal volume 203. In one example, the annular plug 393 is coupled to the insulation 206 so that the annular plug 393, insulation 206 and center electrode 204 are moveable in tandem. Adjusting a position of the moveable element thus includes moving the annular plug 393, center electrode 204, and insulation 206 in tandem in a first direction towards the first end 213 (e.g., away from the second end 211), or moving the annular plug 393, center electrode 204, and insulation 206 in tandem in a second direction towards the second end 211 (e.g., away from the first end 213). When the position of the center electrode 204 (and insulation 206) is adjusted, a size of the spark gap 240 changes. Specifically, moving the center electrode 204 in a first direction towards the first end 213 increases the size of the spark gap 240 by the distance that the center electrode 204 is moved; moving the center electrode 204 in a second direction towards the second end 211 decreases the size of the spark gap 240 by the distance that the center electrode 204 is moved. As such, when the annular plug 393 and center electrode 204 are moved in tandem, a distance that the annular plug 393 and center electrode 204 are moved may be limited by a lower and upper threshold spark gap. In one example, the lower and upper threshold spark gaps may vary depending on ignition energy and other factors. When the spark gap 240 is less than the lower threshold spark gap or greater than the upper threshold spark gap, spark ignition in the pre-chamber may not be robust, leading to poor combustion quality. In one example controller 12 may move the annular plug 393, center electrode 204, and insulation 206 in tandem, while maintaining a spark gap 240 between the lower threshold spark gap and the upper threshold spark gap, to preserve combustion quality.

As shown in the example of FIGS. 4A and 4B, when moved in tandem, the annular plug 393 may be coupled to the insulation 206 at an axial position closer to the center electrode tip 244 than the first end 213. However, in other examples the annular plug 393 may be coupled at a midpoint (along z-coordinate dimension) or at an axial position closer to the first end 213 of the center electrode 204. Coupling the annular plug 393 at an axial position closer to the center electrode tip 244 may allow for adjusting the position of the annular plug 393 over a greater range towards the first end 213, while coupling the annular plug 393 at an axial position closer to the first end 213 may allow for adjusting the position of the annular plug 393 over a greater range towards the second end 211.

In another example, the position of the annular plug 393 may be adjusted independently from adjusting the position of the center electrode 204 (and insulation 206). As such, a size of the spark gap 240 and the magnitude of the dead volume 284 can be adjusted independently and can both be adjusted responsive to changing engine operating conditions.

In the example pre-chamber system 400 of FIGS. 4A and 4B, the annular plug 393 is shown having a longer axial length that extends beyond the first end 213. Beyond the first end 213, an external housing, similar in material to pre-chamber body 202, may enclose the annular plug 393, and any other components extending beyond the first end 213, such as center electrode 204, insulation 206, and the like. Although the annular plug 393 may extend beyond the body 202 at first end 213, the internal volume 203 of the pre-chamber 188 is fluidly decoupled from these portions of the annular plug 393 extending beyond the body 202 at the first end 213. In other words, fluids in the internal volume 203 are sealed from exiting the internal volume 203 at the first end 213.

In other examples, the pre-chamber system 400 may include an annular plug 393 that does not extend beyond the first end 213, analogous to the annular plug 393 depicted in pre-chamber system 200 of FIGS. 3A and 3B. In this case, pre-chamber system 400 may include additional volume 486 that is not fluidly coupled to the spark gap 240, and adjusting the annular plug 393 in tandem with the center electrode 204 (and insulation 206) increases or decreases a magnitude of the internal volume 203 that is fluidly coupled to the spark gap 240 while decreasing or increasing, respectively, the magnitude of additional volume 486. Furthermore, adjusting the annular plug 393 in tandem with the center electrode 204 (and insulation 206) increases or decreases a magnitude of the dead volume 284 as a fraction of the internal volume 203, as described above with reference to FIGS. 4A and 4B.

Annular plug 393 and the center electrode 204 (and insulation 206) may be movable along central axis 299 by way of actuator 225. For example, actuator 225 may adjust the position of the annular plug 393 and the center electrode (independently or in tandem) in a direction that is parallel to central axis 299. Adjusting a position of the annular plug 393 without adjusting the position of the center electrode 204 allows for adjusting a magnitude of the dead volume 284 and the additional volume 386, without adjusting the size of the ignition volume 283. Actuator 225 may be directly coupled to the annular plug 393 and/or center electrode 204, and may thereby act directly on the annular plug 393 and/or center electrode 204, or may be indirectly coupled thereto, respectively, by way of a linkage, a cam, etc. In the example shown, the annular plug 393 and/or center electrode 204 are coupled to actuator 225 by way of a linkage 427, and thus, movement of the linkage may be transferred to the annular plug 393 and/or center electrode 204. In some examples, actuator 225 may continuously vary the position of the annular plug 393 and/or center electrode 204 to adjust a ratio of dead volume 284 to total pre-chamber volume, spark gap 240, and/or ignition volume 283, based on engine conditions such as the effective compression ratio and intake valve close (IVC) timing, engine load, coolant temperature, engine speed, EGR, VCT, VVT, coolant temperature, and/or air temperature. In other examples, actuator 225 may vary the position of the annular plug 393 and/or center electrode 204 in a step-wise manner based on engine conditions such as the effective compression ratio and intake valve close (IVC) timing, engine load, coolant temperature, engine speed, EGR, VCT, VVT, coolant temperature, and/or air temperature.

In one example, in response to IVC timing moving earlier from BDC or moving later from BDC, controller 12 (by way of actuator 225) may move the moveable element in the pre-chamber internal volume 203 to increase the ratio of the dead volume 284 to total pre-chamber internal volume 203. Thus, in the pre-chamber system 400, controller 12 may adjust the position of the annular plug 393 away from the first end 213 to decrease the total pre-chamber internal volume 203 and increase the ratio of the dead volume 284 to the total pre-chamber internal volume 203, responsive to the IVC timing moving further away from BDC (e.g., moving earlier from BDC or moving later from BDC). Furthermore, controller 12 may adjust the position of the annular plug 393 towards the first end 213 to increase the total pre-chamber internal volume 203 and decrease the ratio of the dead volume 284 to the total pre-chamber internal volume 203, responsive to the IVC timing moving towards BDC. Conversely, responsive to a decrease in total pre-chamber internal volume 203 and an increase in the ratio of the dead volume 284 to the total pre-chamber internal volume 203, the controller 12 may adjust the IVC timing by moving the IVC timing earlier or later (e.g., further away) from BDC.

Turning now to FIGS. 5A and 5B, they show a longitudinal cross-sectional view of a pre-chamber system 500. Pre-chamber system 500 is similar to pre-chamber system 200 and pre-chamber system 300. As such, components previously introduced in FIGS. 2A, 3A, 3B, and 3C are numbered identically in FIGS. 5A and 5B. In the pre-chamber system 500, the pre-chamber internal volume 203 includes the ignition volume 283 and the dead volume 284. The ignition volume 283 includes the portion of the internal volume 203 that is positioned between the spark gap 240 and the second end 211, and the dead volume 284 includes the portion of the internal volume 203 that is positioned between the first end 213 and the spark gap 240 that is fluidly coupled to the spark gap 240. In the pre-chamber system 500, ground electrode 246 may extend axially from the spark gap 240 proximal to the center electrode tip 244 to beyond the pre-chamber body 202 at the first end 213. In this way, the ground electrode 246 may contact the body 202 at the first end 213, thereby coupling the ground electrode 246 to an electrical ground.

A fourth embodiment of a moveable element positioned in the internal volume 203 between the first end 213 and the spark gap 240 and fluidly coupled to the dead volume 284, includes the center electrode 204 (including center electrode tip 244 and insulation 206) and the ground electrode 246. The positions of the center electrode 204 (and insulation 206) and ground electrode 246 are adjustable, as indicated by the bidirectional arrows 595 and 597, respectively. FIG. 5A depicts the pre-chamber system 400 including the center electrode 204, insulation 206, and ground electrode 246 positioned more towards the second end 211, while FIG. 5B depicts the pre-chamber system 500 including the center electrode 204, insulation 206, and ground electrode 246 positioned more towards the first end 213.

In one example, the center electrode 204, insulation 206 and ground electrode 246 are moveable in tandem. Adjusting a position of the moveable element thus includes moving the center electrode 204, insulation 206, and ground electrode 246 in tandem in a first direction towards the first end 213 (e.g., away from the second end 211), or moving the center electrode 204, insulation 206, and ground electrode 246 in tandem in a second direction towards the second end 211 (e.g., away from the first end 213). Furthermore, adjusting the position of the center electrode 204 and the ground electrode 246 also adjusts an axial position of the spark gap 240. Specifically, moving the center electrode 204 in tandem with the ground electrode 246 in a first direction towards the first end 213 moves the spark gap 240 towards the first end, and thereby increases the magnitude of the ignition volume 283, while decreasing a magnitude of the dead volume 284 and maintaining a magnitude of the internal volume 203; moving the center electrode 204 in tandem with the ground electrode 246 in a second direction towards the second end 211 moves the spark gap 240 towards the second end, and thereby decreases the magnitude of the ignition volume 283 while increasing a magnitude of the dead volume 284 and maintaining a magnitude of the internal volume 203.

In another example, the position of the center electrode 204 may be adjusted independently from adjusting the position of the ground electrode 246. As such, a size of the spark gap 240 and the magnitude of the dead volume 284 can be adjusted simultaneously, and can both be adjusted independently responsive to changing engine operating conditions.

The center electrode 204 and the ground electrode 246 may be movable along central axis 299 by way of actuator 225. For example, actuator 225 may adjust the position of the center electrode 204 and the ground electrode 246 (independently or in tandem) in a direction that is parallel to central axis 299. Adjusting a position of the center electrode 204 in tandem with adjusting the position of the ground electrode 246 allows for adjusting a magnitude of the dead volume 284 while adjusting the size of the ignition volume 283 (the pre-chamber internal volume 203 remains constant). Actuator 225 may be directly coupled to the center electrode 204 and/or ground electrode 246, and may thereby act directly on the center electrode 204 and/or ground electrode 246, or may be indirectly coupled thereto, respectively, by way of a linkage, a cam, etc. In the example shown, the center electrode 204 and/or ground electrode 246 are coupled to actuator 225 by way of a linkage 527, and thus, movement of the linkage may be transferred to the center electrode 204 and/or ground electrode 246. In some examples, actuator 225 may continuously vary the position of the center electrode 204 and/or ground electrode 246 to adjust a magnitude of the dead volume 284, spark gap 240, and/or ignition volume 283, based on engine conditions such as the effective compression ratio and intake valve close (IVC) timing, engine load, coolant temperature, engine speed, EGR, VCT, VVT, coolant temperature, and/or air temperature. In other examples, actuator 225 may vary the position of the center electrode 204 and/or ground electrode 246 in a step-wise manner based on engine conditions such as the effective compression ratio and intake valve close (IVC) timing, engine load, coolant temperature, engine speed, EGR, VCT, VVT, coolant temperature, and/or air temperature.

In one example, in response to IVC timing moving earlier from BDC or moving later from BDC, controller 12 (by way of actuator 225) may move the moveable element in the pre-chamber internal volume 203 to increase the dead volume 284. Thus, in the pre-chamber system 500, controller 12 may adjust the position of the center electrode 204 in tandem with adjusting the position of the ground electrode 246 away from the first end 213 to increase the dead volume 284 while decreasing the ignition volume 283 responsive to the IVC timing moving further away from BDC (e.g., moving earlier from BDC or moving later from BDC). Furthermore, controller 12 may adjust the position of the center electrode 204 in tandem with adjusting the position of the ground electrode 246 towards the first end 213 to decrease the dead volume 284 while increasing the ignition volume 283 responsive to the IVC timing moving towards BDC. Conversely, responsive to an increase in the dead volume 284, the controller 12 may adjust the IVC timing by moving the IVC timing earlier or later from BDC.

In this manner, an engine includes an engine cylinder coupled to a cylinder head, and a pre-chamber. The pre-chamber includes a first end proximal to the cylinder head, a spark gap, and pre-chamber walls enclosing an internal volume including a dead volume, the dead volume including all of the internal volume positioned between the first end and the spark gap. The pre-chamber further includes a moveable element positioned in the internal volume and fluidly coupled to the dead volume, wherein moving the moveable element changes a ratio of the dead volume to the internal volume. In a first example of the engine, the pre-chamber further includes a center electrode, the center electrode positioned along a central axis of the pre-chamber, and extending from the first end to the spark gap, and between the first end and the spark gap, the center electrode, the internal volume, and the pre-chamber walls are concentric about the central axis. In a second example of the engine, optionally including the first example of the engine, the moveable element includes a valve, wherein opening the valve increases the dead volume. In a third example of the engine, optionally including one or more of the first and second examples of the engine, closing the valve decreases the dead volume. In a fourth example of the engine, optionally including one or more of the first through third examples of the engine, the moveable element includes an annular plug positioned around a center electrode, wherein moving the annular plug towards the first end increases the dead volume. In a fifth example of the engine, optionally including one or more of the first through fourth examples of the engine, moving the annular plug away from the first end decreases the dead volume. In a sixth example of the engine, optionally including one or more of the first through fifth examples of the engine, the moveable element includes an annular plug positioned around and coupled to a center electrode, wherein moving the annular plug and the center electrode towards the first end increases the internal volume and decreases the ratio of the dead volume to the internal volume. In a seventh example of the engine, optionally including one or more of the first through sixth examples of the engine, moving the annular plug and the center electrode away from the first end decreases the internal volume and increases the ratio of the dead volume to the internal volume. In an eighth example of the engine, optionally including one or more of the first through seventh examples of the engine, the spark gap is positioned between a center electrode and a ground electrode, and wherein the moveable element includes the center electrode and the ground electrode, wherein moving the center electrode and the ground electrode towards the first end decreases the dead volume.

Figure 7:
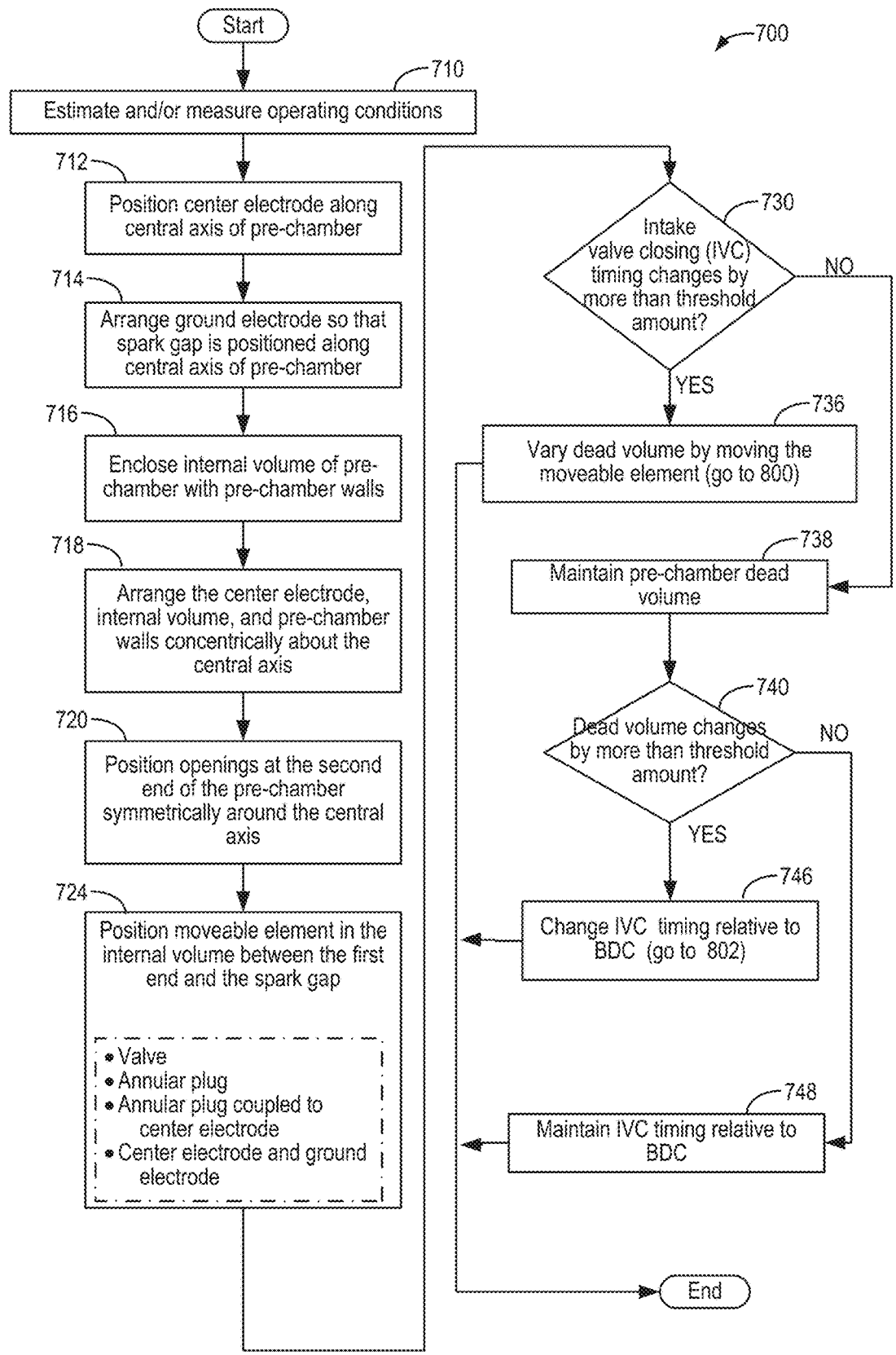
FIGS. 7, 8A, and 8B show example flow charts illustrating a method for operating an adjustable pre-chamber, such as the pre-chamber systems of FIGS. 2A, 3A, 3B, 3D, 4A, 4B, 5A, and 5B.
Figure 8A:
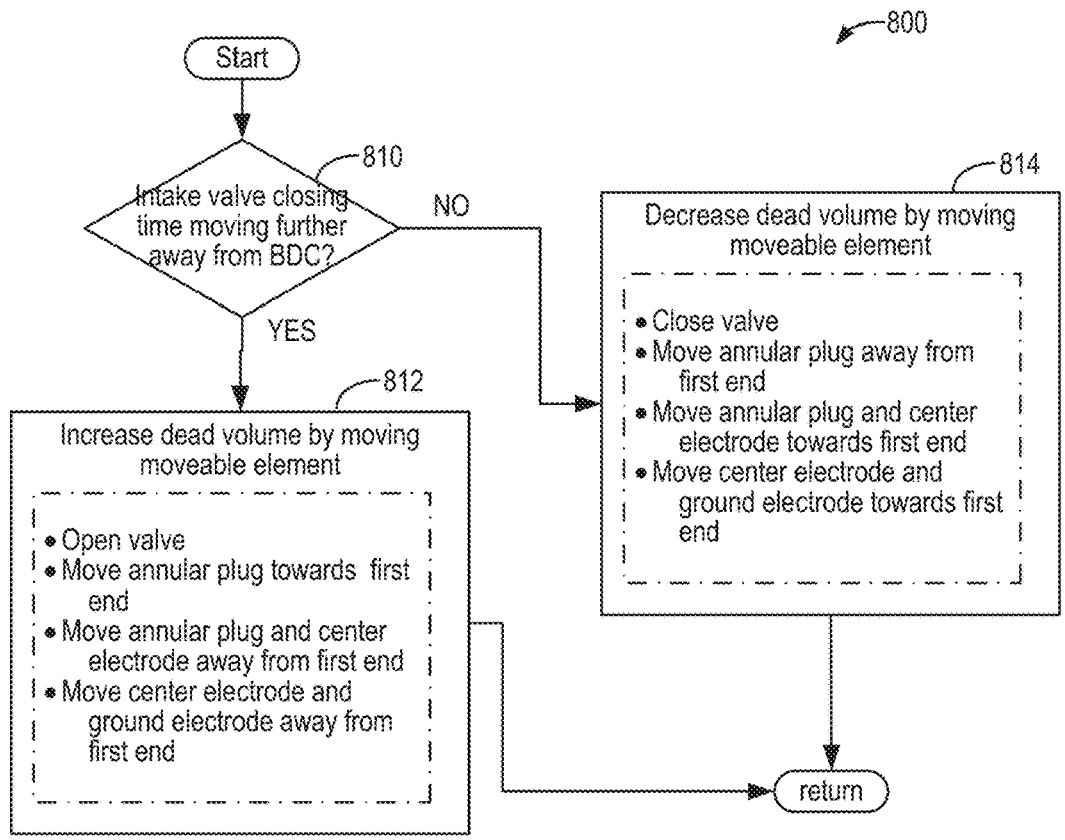
Figure 8B:
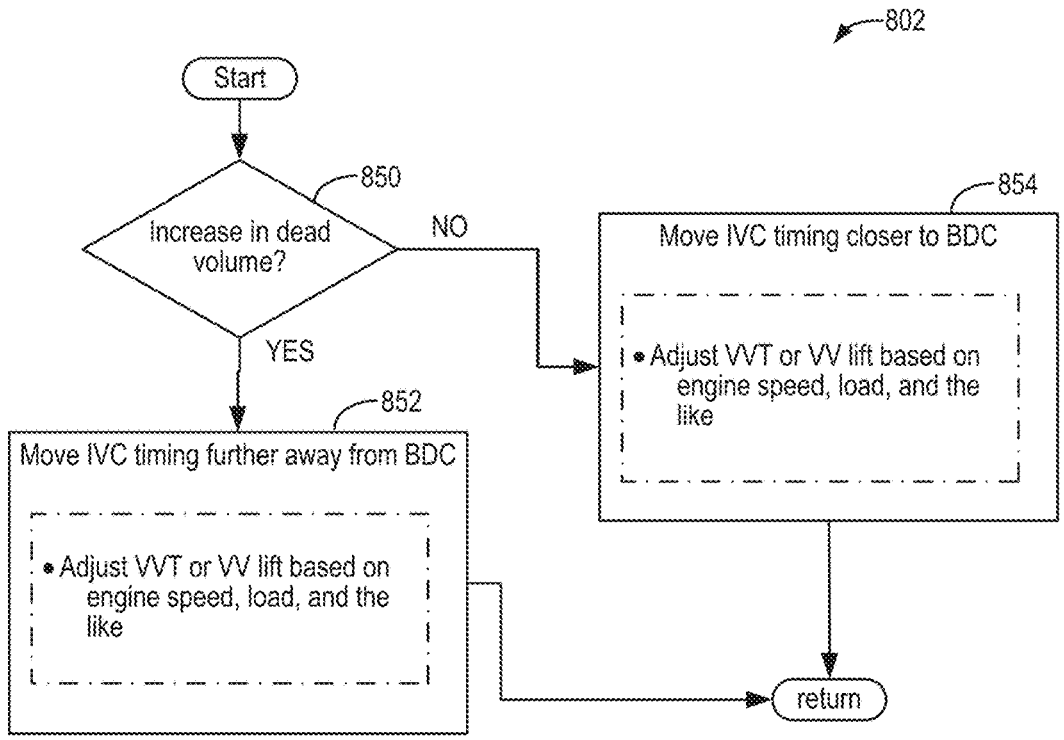
Figure 9:
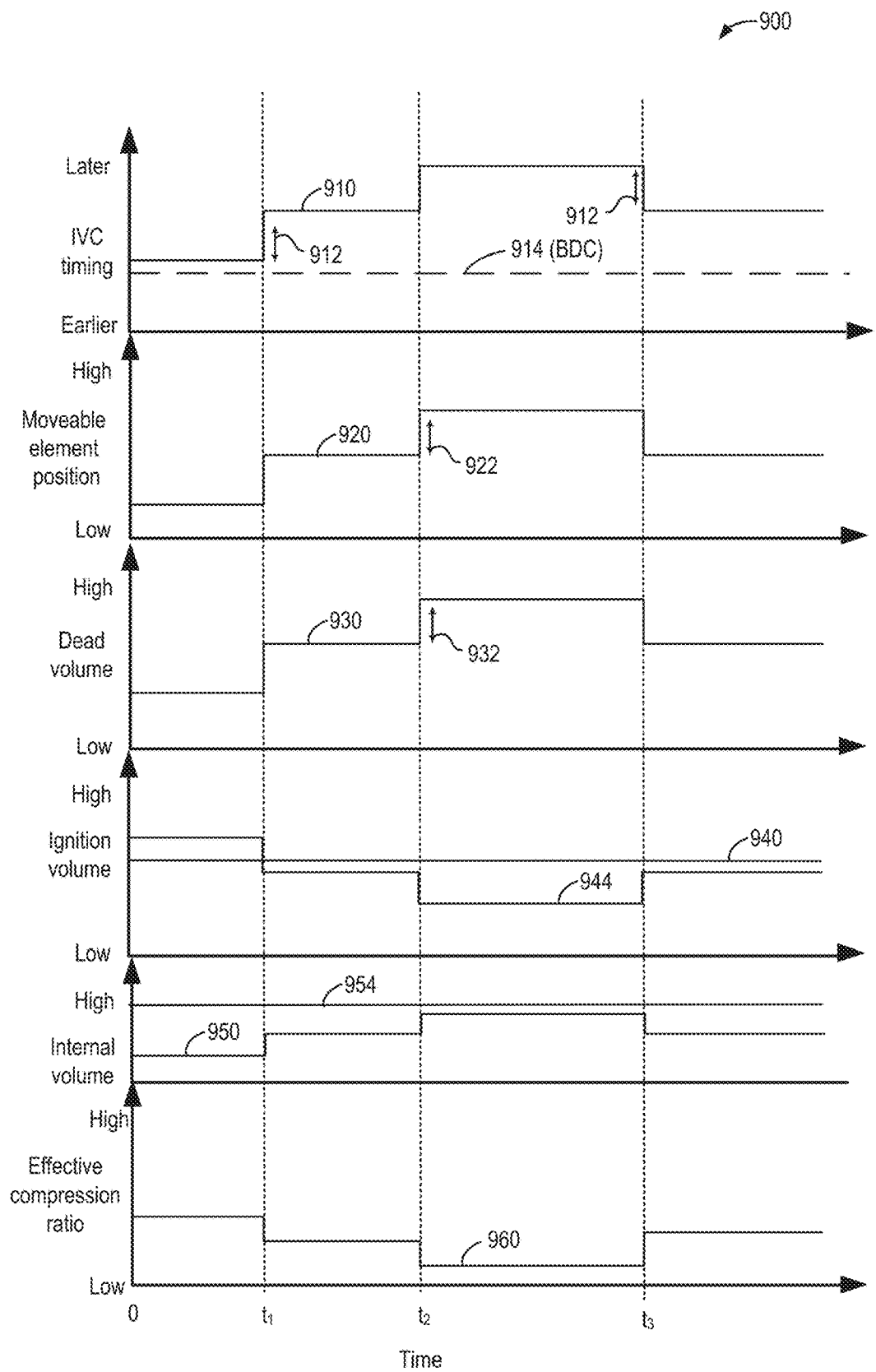
FIG. 9 shows an example timeline corresponding to operating an engine including an adjustable pre-chamber, such as the pre-chamber systems of FIGS. 2A, 3A, 3B, 3D, 4A, 4B, 5A, and 5B.

Turning now to FIGS. 7, 8A and 8B, flow charts representing methods 700, 800, and 802 are shown for operating a pre-chamber 188 of a pre-chamber system such as pre-chamber systems 200, 300, 400, and/or 500 in an engine 10. The methods of FIGS. 7, 8A, and 8B are directed to moving a moveable element of the pre-chamber 188 to increase or decrease a dead volume 284. As already described, moving the moveable element to increase or decrease the dead volume 284 can include increasing or decreasing the dead volume 284, respectively, as a percent of the total pre-chamber internal volume 203 that is fluidly coupled to the spark gap 240. Instructions for carrying out the methods 700, 800, and 802 may be executed by a controller 12 based on instructions stored on a memory of the controller 12 and in conjunction with signals received from sensors of the engine, such as the sensors described above with reference to FIG. 1. The controller 12 may employ engine actuators of the engine 10 to adjust engine operation, according to the methods described below. Execution of methods 700, 800, and 802 may be applied to one or more pre-chambers 188 of the engine 10.

At 710, method 700 includes estimating and/or measuring operating conditions. The engine operating conditions may include, for example, effective compression ratio, IVC timing, engine speed, load, EGR, VCT/VVT, coolant temperature, and/or air temperature, and the like. The engine operating conditions may be measured by one or more sensors communicatively coupled to the controller 12 or may be inferred based on available data. For example, the controller 12 may estimate the engine load by inputting a throttle position and a mass air flow (MAF) sensor reading into one or more look-up tables, maps, or functions, which may output the engine load. As another example, engine load may be determined in response to the manifold vacuum, determined via a pressure sensor or estimated based on an engine speed and mass air flow. As another example, the engine temperature may be measured by an engine coolant temperature sensor, such as ECT sensor 112 of FIG. 1. As yet another example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque.

At 712, method 700 includes positioning the center electrode 204 of the pre-chamber 188 along a central axis 299 of the pre-chamber. The central axis 299 may include a longitudinal axis about which the pre-chamber exhibits rotational symmetry. Next, at 714, method 700 includes arranging the ground electrode 246 so that the spark gap 240 is positioned along the central axis 299 of the pre-chamber. At 716, method 700 continues by enclosing the internal volume 203 of the pre-chamber 188 with the pre-chamber walls. The pre-chamber walls may include the pre-chamber body 202 and pre-chamber sleeve 235, as well as pre-chamber cap 234. Next, at 718, method 700 includes arranging the center electrode 204, the internal volume 203, and the pre-chamber walls concentrically about the central axis 299. In one example, the internal volume 203 and the pre-chamber walls form successive concentric circular cylindrical layers about the central axis 299. At 720, method 700 includes positioning openings at the second end of the pre-chamber symmetrically around the central axis 299. In the steps 712 through 720, elements of the pre-chamber are configured to preserve rotational symmetry therein so that a uniformity of heat and mass transfer throughout the pre-chamber 188 is increased. Furthermore, preserving rotational symmetry in the pre-chamber system reduces regions of low flow or heat transfer such as dead spots, thereby reducing heat and mass transfer limitations in the pre-chamber system during engine operation. Because the pre-chamber ignition, including spark generation and propagation of flame jets from the pre-chamber 188 into the cylinder 130, occurs on a very fast and dynamic timescale (as described herein with reference to FIG. 6), reducing heat and mass transfer limitation in the pre-chamber can aid in increasing combustion robustness and reducing engine misfires.

Next, at 724, method 700 includes positioning a moveable element in the internal volume 203, between the first end 213 of the pre-chamber 188 and the spark gap 240. As described with reference to FIGS. 2A, 3A, 3B, 3D, 4A, and 4B, the moveable element may be represented by various embodiments such as one or more valves, an annular plug, an annular plug and the center electrode, and the center and ground electrodes. Furthermore, moving one or more of the moveable elements adjusts a magnitude of the dead volume 284. Depending on the configuration of the moveable element, moving the moveable element can change the dead volume 284 while changing the ignition volume 283, or change the dead volume 284 without changing the ignition volume 283. In every embodiment, moving the moveable element changes the magnitude of the dead volume 284 and/or changes the dead volume 284 as a fraction of the total pre-chamber internal volume 203. Furthermore, in the embodiments of FIGS. 2A, 2B, 3A, 3B, 4A, and 4B, moving the moveable element changes the magnitude of the total pre-chamber internal volume 203 that is fluidly coupled to the spark gap 240. Further still, in the embodiment of FIGS. 5A and 5B, moving the moveable element does not change the magnitude of the total pre-chamber internal volume 203 that is fluidly coupled to the spark gap 240.

Next, method 700 continues at 730 where the controller 12 may determine if a change in IVC timing is detected. In one example, a change in IVC timing may be detected when the IVC timing as compared with the previous IVC timing changes by more than a threshold IVC timing difference. In one example, the threshold IVC timing difference may include 5 degrees. In other words, a change in IVC timing may be detected with the IVC timing as compared with the previous IVC timing moves earlier by 5 degrees or more, or moves later by 5 degrees or more. In general, IVC timing may vary over a range of 50 to 80 degrees, depending on engine operating conditions, with expected oscillations during steady-state engine operation of from 2 to 4 degrees. In the case where the IVC timing mechanism includes variable camshaft timing or variable camshaft phasing, the controller 12 may determine IVC timing changes by measuring changes in the camshaft timing indicated by way of pulse wheels on the camshaft and crankshaft. In other cases the controller 12 may receive an indication of IVC timing and IVC timing changes by measuring the cam opening duration (with or without a change in valve lift). Responsive to the case where a change in IVC timing is detected, method 700 continues at 736, where the controller 12 moves the moveable element to effect a change in the dead volume, including changing a ratio of the dead volume to the internal volume.

Turning now to FIG. 8A, method 800 determines, based on engine operating conditions, the desired change in the dead volume, and the corresponding way to move the moveable element to effect the desired change in the dead volume. At 810 of method 800, the controller 12 determines if the IVC timing relative to BDC is increasing, e.g., if IVC is moving further away from BDC. The IVC timing relative to BDC may be increasing if the IVC timing is earlier or later than the previous IVC timing by more than the threshold IVC timing difference. For the case where the IVC timing relative to BDC is increasing (e.g., if an IVC before BDC is becoming earlier, or if an IVC after BDC is becoming later), method 800 continues at 812 where the controller 12 moves the moveable element to increase the dead volume (including increasing a ratio of the dead volume to the internal volume), since the effective compression ratio is reduced by earlier/later IVC timing relative to BDC. In the example of pre-chamber system 200, controller 12 may open the one or more valves 293 and 295 to fluidly couple additional volumes 286 and 288 to the dead volume 284, thereby incorporating the additional volumes 286 and 288 into the dead volume 284 and increasing the magnitude thereof. In the example of pre-chamber system 300, controller 12 may move the annular plug 393 more towards the first end 213, thereby increasing a magnitude of the dead volume 284. In the pre-chamber system 400, controller 12 may move the annular plug 393 and the center electrode 204 away from the first end 213, thereby decreasing the total pre-chamber volume and increasing the dead volume 284 as a fraction of the total pre-chamber volume. In the pre-chamber system 500, controller 12 may move the center electrode 204 and the ground electrode 246 more towards the second end 211 (e.g., more away from the first end 213), thereby increasing a magnitude of the dead volume 284, while decreasing a magnitude of the ignition volume 283.

Furthermore, moving the moveable element to increase the dead volume 284 maintains the rotational symmetry of the dead volume 284 about the central axis 299. In particular, the dead volume 824 increases in magnitude while maintaining its rotational symmetry about the central axis 299. For example, additional volume may be incorporated into the dead volume 284 in a rotationally symmetric manner about the central axis 299. Accordingly, during cylinder compression, residual burned gas flows in a rotationally symmetric manner from the ignition volume 283 to the dead volume 284, even when a magnitude of the dead volume 284 changes.

For the case where the IVC timing relative to BDC is decreasing (e.g., becoming less early or less later by moving closer to BDC), method 800 continues at 814 where the controller 12 moves the moveable element to decrease the dead volume (including decreasing a ratio of the dead volume to the internal volume), since the effective compression ratio is increased by less early/later IVC timing relative to BDC. In the example of pre-chamber system 200, controller 12 may close the one or more valves 293 and 295 to fluidly decouple additional volumes 286 and 288 to the dead volume 284, thereby decoupling the additional volumes 286 and 288 into the dead volume 284 and decreasing the magnitude of the dead volume 284. In the example of pre-chamber system 300, controller 12 may move the annular plug 393 more towards the second end 211, thereby decreasing a magnitude of the dead volume 284. In the pre-chamber system 400, controller 12 may move the annular plug 393 and/or the center electrode 204 more towards the first end 213, thereby increasing the total pre-chamber volume and decreasing the dead volume 284 as a fraction of the total pre-chamber volume. In the pre-chamber system 500, controller 12 may move the center electrode 204 and the ground electrode 246 more towards the first end 213, thereby decreasing a magnitude of the dead volume 284, while increasing a magnitude of the ignition volume 283.

Furthermore, moving the moveable element to decrease the dead volume 284 maintains the rotational symmetry of the dead volume 284 about the central axis 299. In particular, the dead volume 824 decreases in magnitude while maintaining its rotational symmetry about the central axis 299. For example, additional volume may be fluidly decoupled from the dead volume 284 in a rotationally symmetric manner about the central axis 299. Accordingly, during cylinder compression, residual burned gas flows in a rotationally symmetric manner from the ignition volume 283 to the dead volume 284, even when a magnitude of the dead volume 284 changes.

Following 812 and 814, method 800 returns to method 700 after 736. Returning to FIG. 7, after 736, method 700 ends. Returning to 730 for the case where a change in IVC timing is not detected, method 700 continues at 738 where the controller 12 maintains the current pre-chamber dead volume. Maintaining the current pre-chamber dead volume can include the controller 12 maintaining a position of the moveable element in the internal volume 203. For example, for the pre-chamber system 200, the controller 12 may maintain a percent open or closed position of the one or more valves 293 and 295. For the pre-chamber system 300, the controller 12 may maintain an axial position of the annular plug 393. For the pre-chamber system 400, the controller 12 may maintain an axial position of the annular plug 393 and/or center electrode 204. For the pre-chamber system 500, the controller 12 may maintain a position of the center electrode 204 and ground electrode 246.

Next, method 700 continues at 740 where the controller 12 determines if there has been a change in the dead volume 284. A change in the dead volume 284 may be determined if the dead volume has increased or decreased by more than a threshold volume difference. In another example, a change in the dead volume may be determined if a position of one or more moveable elements in the internal volume 203 changes by more than a threshold amount. In the pre-chamber system 200, a change in the dead volume may be determined if a position of one or more valves 293 and 295 has changed by more than a threshold change in valve position. In the pre-chamber system 300, a change in the dead volume may be determined if a position of the annular plug 393 has changed by more than a threshold amount. In the pre-chamber system 400, a change in the dead volume may be determined if a position of the annular plug 393 and/or the center electrode 204 has changed by more than a threshold amount. In the pre-chamber system 500, a change in the dead volume may be determined if a position of the center electrode 204 and/or ground electrode 246 has changed by more than a threshold amount.

In another example, a change in the dead volume 284 may include a change in the dead volume 284 as compared to a desired or set point dead volume. As such, the controller 12 may determine the dead volume 284 changing by more than the threshold amount, when a difference between the dead volume 284 and the desired dead volume changes by more than the threshold amount. In particular, the difference between the dead volume 284 and the desired dead volume may change based on a change in the dead volume 284 and/or a change in the desired (e.g., set point dead volume). The desired dead volume may be predetermined by the controller 12 based on engine operating conditions. In one example, the controller 12 may determine a difference between the dead volume 284 and the desired dead volume changing by more than the threshold amount for the case where a desired dead volume changes responsive to changing engine operating conditions, but due to a failure mode or vehicle operating condition, the dead volume is not changed responsively as much as desired. Responsive to the difference between the dead volume 284 and the desired dead volume changing by more than the threshold amount, the controller 12 may adjust the IVC timing.

For the case where a change in the dead volume is determined, method 700 continues at 746 where the controller 12 changes the IVC timing relative to BDC, according to method 802. Turning now to FIG. 8B, method 802 starts at 850, where the controller 12 determines if the change in the dead volume includes the dead volume increasing (including a ratio of the dead volume to the internal volume increasing), since the last determination. In the pre-chamber system 200, an increase in the dead volume may be determined if a position of one or more valves 293 and 295 has been moved to a more open position. In the pre-chamber system 300, an increase in the dead volume may be determined if the annular plug 393 has been moved towards the first end 213. In the pre-chamber system 400, an increase in a ratio of the dead volume to the internal volume may be determined if the annular plug 393 and/or the center electrode 204 have been moved away from the first end 213. In the pre-chamber system 500, an increase in a ratio of the dead volume to the internal volume may be determined if the center electrode 204 and/or ground electrode 246 has been moved towards the second end 211.

For the case where an increase in the dead volume is determined, method 802 continues at 852 where the controller 12 increases the IVC timing relative to BDC. In other words, the controller 12 may adjust VVT and/or VV lift in order to move the IVC timing further (e.g., earlier or later) from BDC, thereby decreasing the effective compression ratio, in response to the increase in dead volume. Returning to 850 for the case where an increase in the dead volume is not determined (e.g., a decrease in dead volume and/or a decrease in a ratio of the dead volume to the internal volume is determined), method 802 continues at 854 where the controller 12 decreases the IVC timing relative to BDC. In other words, the controller 12 may adjust VVT and/or VV lift in order to move the IVC timing closer (e.g., less early or less late from BDC), thereby increasing the effective compression ratio, in response to the increase in dead volume. After 852 and 854, method 802 returns to method 700 after 746. Returning to FIG. 7, after 746, method 700 ends.

Returning to 740, for the case where the controller 12 determines that the dead volume has not changed, method 700 continues at 748 where the controller 12 maintains the current IVC timing relative to BDC. After 736, 746, and 748, method 700 ends.

In this manner, a method for an engine, wherein the engine includes an engine cylinder, a cylinder head, and a pre-chamber, includes enclosing an internal volume of the pre-chamber with pre-chamber walls, positioning a spark gap in the internal volume, the internal volume including a dead volume, the dead volume including all of the internal volume positioned between a first end of the pre-chamber and the spark gap, the first end of the pre-chamber proximal to the cylinder head, positioning a moveable element in the internal volume, wherein the moveable element is fluidly coupled to the dead volume, and varying the dead volume, including varying a ratio of the dead volume to the internal volume, by moving the moveable element. In a first example, the method further includes positioning openings at a second end of the pre-chamber, and fluidly coupling the internal volume to the engine cylinder by way of the openings, wherein the pre-chamber walls enclose the internal volume of the pre-chamber except for the openings, and wherein the second end is positioned distally to the cylinder head. In a second example, optionally including the first example, the method further includes, wherein varying the dead volume comprises moving the moveable element to vary the dead volume without changing an ignition volume, wherein the ignition volume includes all of the internal volume between the spark gap and the openings. In a third example, optionally including one or more of the first and second examples, the method further includes, wherein varying the dead volume comprises moving the moveable element to vary the dead volume while changing the ignition volume. In a fourth example, optionally including one or more of the first through third examples, the method further includes, wherein varying the dead volume by moving the moveable element includes moving the moveable element responsive to a change in an intake valve closing timing. In a fifth example, optionally including one or more of the first through fourth examples, the method further includes, changing an intake valve closing timing responsive to a change in the dead volume.

Turning now to FIG. 9, it illustrates a timeline 900 for operating an engine including an adjustable pre-chamber, such as the pre-chamber systems of FIGS. 2A, 3A, 3B, 3D, 4A, 4B, 5A, and 5B. Trend lines are shown for IVC timing 910, moveable element position 920, dead volume 930, ignition volumes 940 and 944, internal volume 950 and 954, and effective compression ratio 960. Also shown are IVC timing at BDC 914, a threshold IVC timing change 912, a threshold moveable element position change 922, and a threshold dead volume change 932.

With respect to trend line 920, a higher moveable element position may correspond to a moveable element position where the dead volume is higher (and/or higher as a fraction of the pre-chamber internal volume), and a lower moveable element position may correspond to a moveable element position where the dead volume is lower (and/or lower as a fraction of the pre-chamber internal volume). Accordingly the trend line 930 may represent a magnitude of the dead volume and/or a magnitude of the dead volume as a fraction of the pre-chamber internal volume. For example, for the pre-chamber system 200, a higher moveable element position may correspond to when one or more of valves 293 and 295 are open and a lower moveable element position may correspond to when one or more of valves 293 and 295 are closed. Similarly, for the pre-chamber system 300, a higher moveable element position may correspond to when annular plug 393 is moved more towards the first end 213 and a lower moveable element position may correspond to when moved more away from the first end 213 (e.g., more towards the second end 211). Furthermore, for the pre-chamber systems 400, a higher moveable element position may correspond to when annular plug 393 (and center electrode 204) is moved more away from the first end 213 (e.g., towards the second end 211) and a lower moveable element position may correspond to when moved more towards the first end 213 (e.g., more away from the second end 211). Further still, for the pre-chamber systems 500, a higher moveable element position may correspond to when center electrode 204 and ground electrode 246 are moved more away from the first end 213 (e.g., towards the second end 211) and a lower moveable element position may correspond to when moved more towards the first end 213 (e.g., more away from the second end 211).

Two ignition volume trend lines 940 and 944 are included for illustrative purposes; trend line 940 may correspond to the ignition volume for a pre-chamber system such as pre-chamber system 200, 300, and 400, while trend line 944 may correspond to the ignition volume for a pre-chamber system 500. Two internal volume trend lines 950 and 954 are included for illustrative purposes, both representing a magnitude of the internal volume that is fluidly coupled to the spark gap 240 (e.g., not including additional volumes such as additional volumes 286, 386 and 486); trend line 950 may correspond to the internal volume for a pre-chamber system such as pre-chamber system 200, 300, and 400, while trend line 954 may correspond to the internal volume for a pre-chamber system 500.

From time 0 to time t1, IVC timing is constant at a value slightly later than BDC, and the dead volume is constant at a lower value. Because the change in IVC timing is less than the threshold IVC timing change 912 and because the change in dead volume is less than the threshold dead volume change 932, the controller 12 maintains the IVC timing and the moveable element position, as per methods 700, 800, and 802. Accordingly, the ignition volume remains and effective compression ratio remain constant, as does the internal volume.

At time t1, the IVC timing is adjusted from slightly later than BDC to more later than BDC, effecting a change in the IVC timing that is greater than the threshold IVC timing change 912. In one example, the IVC timing may be adjusted to more later than BDC during driving conditions when an engine load is low, to increase fuel economy. As the IVC timing is adjusted later than (e.g., further away from) BDC, the effective engine compression ratio trend line 960 decreases to a lower value at time t1. Responsive to the IVC timing change being greater than the threshold IVC timing change 912, the controller 12 may change the moveable element position 920 to a higher value, which increases a magnitude of the pre-chamber dead volume 930.

In the case of a pre-chamber system such as pre-chamber systems 200, 300 and 400, moving the moveable element (e.g., opening or closing valves 293 and 294, or moving annular plug 393, and the like) changes a magnitude of the dead volume 284 without changing a magnitude of the ignition volume 283. Accordingly, the ignition volume trend line 940 remains constant at time t1. For the case of a pre-chamber system such as pre-chamber system 500, moving the moveable element corresponds to moving the center electrode 204 and the ground electrode 246, which concomitantly changes a magnitude of the ignition volume 283 when a magnitude of the dead volume 284 is changed. In particular, at time t1, the magnitude of the ignition volume 283 is reduced while a magnitude of the dead volume 284 is increased, corresponding to moving the center electrode 204 and the ground electrode 246 away from the first end 213. Accordingly, the ignition volume trend line 944 decreases at time t1.

In the case of a pre-chamber system such as pre-chamber systems 200, 300, and 400, moving the moveable element changes a magnitude of the internal volume 203 that is fluidly coupled to the spark gap 240. In particular, at time t1, the magnitude of the internal volume 203 that is fluidly coupled to the spark gap 240 is increased when a magnitude of the dead volume 284 is increased. Thus, the internal volume trend line 950 increases at time t1. In the case of a pre-chamber system such as pre-chamber system 500, the internal volume 203 remains constant while moving the moveable element. Accordingly, the internal volume trend line 954 remains constant since moving the moveable element changes a magnitude of the dead volume 284 and a magnitude of the ignition volume 283 without changing a magnitude of the internal volume 203.

Next, at time t2, the dead volume 284 is increased greater than a threshold change in the dead volume 932, and the moveable element is changed to a higher position corresponding to a change in position greater than the threshold moveable element position change 922. Responsive to the change in magnitude of the dead volume greater than the threshold dead volume change 932, controller 12 changes the IVC timing to be more later than (e.g., further away from) BDC. As described above with reference to method 700 at 740, the change in magnitude of the dead volume greater than the threshold dead volume change may include a difference between the measured dead volume and a desired dead volume increasing beyond a threshold dead volume change. Furthermore, the controller 12 may adjust the IVC timing to be further away from BDC responsive to determining a difference between the measured dead volume and a desired dead volume increasing beyond a threshold dead volume change.

In the case of a pre-chamber system such as pre-chamber systems 200, 300, and 400, moving the moveable element (e.g., opening or closing valves 293 and 294, or moving annular plug 393) changes a magnitude of the dead volume 284 without changing a magnitude of the ignition volume 283. Accordingly, the ignition volume trend line 940 remains constant at time t2. For the case of a pre-chamber system such as pre-chamber system 500, moving the moveable element corresponds to moving the center electrode 204 and the ground electrode 246, which concomitantly changes a magnitude of the ignition volume 283 when a magnitude of the dead volume 284 is changed. In particular, at time t2, the magnitude of the ignition volume 283 is reduced while a magnitude of the dead volume 284 is increased, corresponding to moving the center electrode 204 and the ground electrode 246 away from the first end 213. For the case of pre-chamber systems 200, 300, and 400, moving the moveable element changes a magnitude of the internal volume 203 that is fluidly coupled to the spark gap 240. In particular, the internal volume trend line 950 increases at time t2 as a magnitude of the dead volume 284 is increased. For a pre-chamber system 500, the internal volume trend line 954 remains constant since moving the moveable element changes a magnitude of the dead volume 284 without changing a magnitude of the internal volume 203. Next, at time t3, the IVC timing is adjusted earlier, from more later than BDC to less later than BDC, effecting a change in the IVC timing that is greater than the threshold IVC timing change 912. In one example, the IVC timing may be adjusted to less later than BDC during driving conditions when an engine load increases such as when climbing a hill, to increase power output from the engine. As the IVC timing is adjusted less later than BDC, the effective engine compression ratio trend line 960 increases to a higher value at time t3. Responsive to the IVC timing change being greater than the threshold IVC timing change 912, the controller 12 may change the moveable element position 920 to a lower value, which decreases a magnitude of the pre-chamber dead volume 930. In the case of a pre-chamber system such as pre-chamber systems 200, 300, and 400, moving the moveable element (e.g., opening or closing valves 293 and 294, or moving annular plug 393) changes a magnitude of the dead volume 284 without changing a magnitude of the ignition volume 283. Accordingly, the ignition volume trend line 940 remains constant at time t3. For the case of a pre-chamber system such as pre-chamber system 500, moving the moveable element corresponds to moving the center electrode 204 and the ground electrode 246, which concomitantly changes a magnitude of the ignition volume 283 when a magnitude of the dead volume 284 is changed. In particular, at time t3, the magnitude of the ignition volume 283 is increased while a magnitude of the dead volume 284 is decreased, corresponding to moving the center electrode 204 and the ground electrode 246 towards the first end 213.

For the case of pre-chamber systems 200, 300, and 400, moving the moveable element changes a magnitude of the internal volume 203 that is fluidly coupled to the spark gap 240. In particular, the internal volume trend line 950 decreases at time t3 as a magnitude of the dead volume 284 is decreased. For a pre-chamber system 500, the internal volume trend line 954 remains constant since moving the moveable element changes a magnitude of the dead volume 284 without changing a magnitude of the internal volume 203.

In this manner, an engine system includes an engine including an engine cylinder with a cylinder head and a pre-chamber. The pre-chamber includes a first end proximal to the cylinder head, a spark gap, pre-chamber walls enclosing an internal volume including a dead volume, the dead volume including all of the internal volume positioned between the first end and the spark gap, and a moveable element positioned in the internal volume and fluidly coupled to the dead volume, wherein moving the moveable element changes a ratio of the dead volume to the internal volume. The engine system further includes a controller, including executable instructions stored in non-transitory memory thereon to move the moveable element in response to a change in engine operating conditions. In a first example, the engine system further includes, wherein the moveable element comprises a valve, and wherein the executable instructions further include increasing the dead volume by opening the valve in response to an intake valve closing timing moving further away from bottom dead center. In a second example, optionally including the first example, the engine system further includes, wherein the moveable element comprises an annular plug, and the executable instructions further include increasing the ratio of the dead volume to the internal volume by moving the annular plug towards the first end in response to an intake valve closing timing moving further away from bottom dead center. In a third example, optionally including one or more of the first and second examples, the engine system further includes, wherein the moveable element further comprises a center electrode and an annular plug positioned around the center electrode, wherein the center electrode is coupled to the annular plug and the executable instructions further include increasing the ratio of the dead volume to the internal volume by moving the annular plug away from the first end in response to an intake valve closing timing moving further away from bottom dead center. In a fourth example, optionally including one or more of the first through third examples, the engine system further includes, wherein the moveable element comprises a center electrode and a ground electrode, wherein the spark gap is positioned between the center electrode and the ground electrode, and wherein the executable instructions further include increasing the ratio of the dead volume to the internal volume by moving the center electrode and the ground electrode away from the first end in response to an intake valve closing timing moving further away from bottom dead center.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine, including an engine cylinder coupled to a cylinder head, and a pre-chamber, the pre-chamber comprising:
    a first end proximal to the cylinder head,
    a spark gap,
    pre-chamber walls enclosing an internal volume including a dead volume, the dead volume including all of the internal volume positioned between the first end and the spark gap, and
    a moveable element positioned in the internal volume and fluidly coupled to the dead volume, wherein moving the moveable element changes a ratio of the dead volume to the internal volume.

2. The engine of claim 1, wherein
    the pre-chamber further comprises a center electrode, the center electrode positioned along a central axis of the pre-chamber, and extending from the first end to the spark gap, and
    between the first end and the spark gap, the center electrode, the internal volume, and the pre-chamber walls are concentric about the central axis.

3. The engine of claim 1, wherein the moveable element includes a valve, wherein opening the valve increases the dead volume.

4. The engine of claim 3, wherein closing the valve decreases the dead volume.

5. The engine of claim 1, wherein the moveable element includes an annular plug positioned around a center electrode, wherein moving the annular plug towards the first end increases the dead volume.

6. The engine of claim 5, wherein moving the annular plug away from the first end decreases the dead volume.

7. The engine of claim 1, wherein the moveable element includes an annular plug positioned around and coupled to a center electrode, wherein moving the annular plug and the center electrode towards the first end increases the internal volume and decreases the ratio of the dead volume to the internal volume.

8. The engine of claim 7, wherein moving the annular plug and the center electrode away from the first end decreases the internal volume and increases the ratio of the dead volume to the internal volume.

9. The engine of claim 1, wherein the spark gap is positioned between a center electrode and a ground electrode, and wherein the moveable element includes the center electrode and the ground electrode, wherein moving the center electrode and the ground electrode towards the first end decreases the dead volume.

10. A method for an engine, the engine including an engine cylinder, a cylinder head, and a pre-chamber, the method comprising:
enclosing an internal volume of the pre-chamber with pre-chamber walls,
positioning a spark gap in the internal volume, the internal volume including a dead volume, the dead volume including all of the internal volume positioned between a first end of the pre-chamber and the spark gap, the first end of the pre-chamber proximal to the cylinder head,
positioning a moveable element in the internal volume, wherein the moveable element is fluidly coupled to the dead volume,
and
varying the dead volume, including varying a ratio of the dead volume to the internal volume, by moving the moveable element.

11. The method of claim 10, further comprising, positioning openings at a second end of the pre-chamber, and fluidly coupling the internal volume to the engine cylinder by way of the openings, wherein the pre-chamber walls enclose the internal volume of the pre-chamber except for the openings, and wherein the second end is positioned distally to the cylinder head.

12. The method of claim 11, wherein varying the dead volume comprises moving the moveable element to vary the dead volume without changing an ignition volume, wherein the ignition volume includes all of the internal volume between the spark gap and the openings.

13. The method of claim 12, wherein varying the dead volume comprises moving the moveable element to vary the dead volume while changing the ignition volume.

14. The method of claim 10, wherein varying the dead volume by moving the moveable element includes moving the moveable element responsive to a change in an intake valve closing timing.

15. The method of claim 10, further comprising changing an intake valve closing timing responsive to a change in the dead volume.

16. An engine system, comprising:
an engine including an engine cylinder with a cylinder head and a pre-chamber, the pre-chamber including,
a first end proximal to the cylinder head,
a spark gap,
pre-chamber walls enclosing an internal volume including a dead volume, the dead volume including all of the internal volume positioned between the first end and the spark gap,
a moveable element positioned in the internal volume and fluidly coupled to the dead volume, wherein moving the moveable element changes a ratio of the dead volume to the internal volume, and
a controller, including executable instructions stored in non-transitory memory thereon to move the moveable element in response to a change in engine operating conditions.

17. The engine system of claim 16, wherein the moveable element comprises a valve, and wherein the executable instructions further include increasing the dead volume by opening the valve in response to an intake valve closing timing moving further away from bottom dead center.

18. The engine system of claim 16, wherein the moveable element comprises an annular plug, and the executable instructions further include increasing the ratio of the dead volume to the internal volume by moving the annular plug towards the first end in response to an intake valve closing timing moving further away from bottom dead center.

19. The engine system of claim 16, wherein the moveable element further comprises a center electrode and an annular plug positioned around the center electrode, wherein the center electrode is coupled to the annular plug and the executable instructions further include increasing the ratio of the dead volume to the internal volume by moving the annular plug away from the first end in response to an intake valve closing timing moving further away from bottom dead center.

20. The engine system of claim 16, wherein the moveable element comprises a center electrode and a ground electrode, wherein the spark gap is positioned between the center electrode and the ground electrode, and wherein the executable instructions further include increasing the ratio of the dead volume to the internal volume by moving the center electrode and the ground electrode away from the first end in response to an intake valve closing timing moving further away from bottom dead center.

\* \* \* \* \*